United States Patent
Meyer et al.

(10) Patent No.: US 11,368,432 B2
(45) Date of Patent: *Jun. 21, 2022

(54) NETWORK CONTAINMENT OF COMPROMISED MACHINES

(71) Applicant: Crowdstrike, Inc., Irvine, CA (US)

(72) Inventors: Paul Meyer, Hudson, WI (US); Cameron Gutman, Redmond, WA (US); John R. Kooker, Poway, CA (US)

(73) Assignee: Crowd Strike, Inc., Irvine, CA (US)

( * ) Notice: Subject to any disclaimer, the term of this patent is extended or adjusted under 35 U.S.C. 154(b) by 126 days.

This patent is subject to a terminal disclaimer.

(21) Appl. No.: 16/877,265

(22) Filed: May 18, 2020

(65) Prior Publication Data
US 2020/0280540 A1 Sep. 3, 2020

Related U.S. Application Data

(62) Division of application No. 15/643,291, filed on Jul. 6, 2017, now Pat. No. 10,659,432.

(51) Int. Cl.
*H04L 29/06* (2006.01)
*G06F 21/55* (2013.01)
*G06F 21/56* (2013.01)

(52) U.S. Cl.
CPC ........ *H04L 63/0263* (2013.01); *G06F 21/554* (2013.01); *G06F 21/566* (2013.01);
(Continued)

(58) Field of Classification Search
CPC ............. H04L 63/0263; H04L 63/0227; H04L 63/0236; G06F 21/554; G06F 21/566
See application file for complete search history.

(56) References Cited

U.S. PATENT DOCUMENTS

| 8,806,638 B1 ‡ | 8/2014 | Mani | G06F 21/568 726/24 |
| 9,811,665 B1 * | 11/2017 | Xu | G06F 21/566 |

(Continued)

FOREIGN PATENT DOCUMENTS

WO    WO2013184281    ‡ 12/2013

OTHER PUBLICATIONS

The Extended European Search Report dated Sep. 10, 2018, fro European Application No. 18181165.4, 8 pages.‡

(Continued)

*Primary Examiner* — Viral S Lakhia
(74) *Attorney, Agent, or Firm* — Lee & Hayes, P.C.

(57) ABSTRACT

A computing device can install and execute a kernel-level security agent that interacts with a remote security system as part of a detection loop aimed at defeating malware attacks. The kernel-level security agent can be installed with a firewall policy that can be remotely enabled by the remote security system in order to "contain" the computing device. Accordingly, when the computing device is being used, and a malware attack is detected on the computing device, the remote security system can send an instruction to contain the computing device, which causes the implementation, by an operating system (e.g., a Mac™ operating system) of the computing device, of the firewall policy accessible to the kernel-level security agent. Upon implementation and enforcement of the firewall policy, outgoing data packets from, and incoming data packets to, the computing device that would have been allowed prior to the implementation of the firewall policy are denied.

17 Claims, 9 Drawing Sheets

(52) U.S. Cl.
CPC ...... *H04L 63/0227* (2013.01); *H04L 63/0236* (2013.01); *G06F 21/56* (2013.01); *G06F 21/562* (2013.01); *G06F 2221/2115* (2013.01); *H04L 63/02* (2013.01); *H04L 63/1441* (2013.01)

(56) References Cited

U.S. PATENT DOCUMENTS

| | | | | |
|---|---|---|---|---|
| 9,894,099 | B1* | 2/2018 | Jacobsen | H04L 63/20 |
| 10,129,255 | B1* | 11/2018 | Gan | H04L 63/10 |
| 10,534,909 | B2* | 1/2020 | Chalmandrier-Perna | G06F 9/45558 |
| 10,547,626 | B1* | 1/2020 | Xiao | H04L 63/145 |
| 10,608,995 | B2* | 3/2020 | Chou | H04L 63/0281 |
| 10,862,885 | B2* | 12/2020 | Zhang | H04L 63/102 |
| 10,885,189 | B2* | 1/2021 | Jeffries | G06F 21/577 |
| 2005/0138416 | A1‡ | 6/2005 | Qian | H04L 63/08 726/4 |
| 2011/0225647 | A1‡ | 9/2011 | Dilley | H04L 63/0218 726/14 |
| 2013/0091538 | A1‡ | 4/2013 | Chirra | H04L 63/0263 726/1 |
| 2013/0111547 | A1‡ | 5/2013 | Kraemer | G06F 21/552 726/1 |
| 2013/0333040 | A1‡ | 12/2013 | Diehl | G06F 9/46 726/24 |
| 2015/0058628 | A1‡ | 2/2015 | Abzarian | H04L 63/0227 713/168 |
| 2015/0288722 | A1‡ | 10/2015 | Sweet | H04L 63/0428 726/1 |
| 2016/0164896 | A1‡ | 6/2016 | Baldonado | H04L 63/1425 726/23 |
| 2016/0323318 | A1‡ | 11/2016 | Terrill | H04L 63/20 |
| 2016/0366184 | A1‡ | 12/2016 | Luo | H04L 63/20 |
| 2017/0126677 | A1‡ | 5/2017 | Kumar | H04L 63/20 |
| 2017/0237749 | A1‡ | 8/2017 | Wood | H04L 63/145 726/23 |
| 2017/0295188 | A1‡ | 10/2017 | David | H04L 63/0428 |
| 2018/0007008 | A1‡ | 1/2018 | Bansal | H04L 63/0263 |
| 2018/0131720 | A1‡ | 5/2018 | Hobson | H04L 63/0263 |
| 2018/0191679 | A1‡ | 7/2018 | Mulka | H04L 45/38 |
| 2018/0270202 | A1‡ | 9/2018 | Li | H04L 63/0281 |
| 2019/0014086 | A1 | 1/2019 | Meyer et al. | |
| 2020/0076835 | A1* | 3/2020 | Ladnai | G06N 5/022 |

OTHER PUBLICATIONS

Office Action for U.S. Appl. No. 15/643,291, dated Jul. 25, 2019, Meyer, "Network Containment of Compromised Machines", 15 pages.

\* cited by examiner
‡ imported from a related application

BEFORE CONTAINMENT

AFTER CONTAINMENT

NETWORK CONTAINMENT OF COMPROMISED MACHINES

CROSS REFERENCE TO RELATED APPLICATION

This patent application is a divisional of and claims priority to co-pending and co-owned U.S. patent application Ser. No. 15/643,291, filed Jul. 6, 2017, entitled "NETWORK CONTAINMENT OF COMPROMISED MACHINES," which is hereby incorporated in its entirety by reference.

BACKGROUND

With Internet use forming an ever greater part of day to day life, malicious software—often called "malware"—that steals or destroys system resources, data, and private information is an increasing problem. Governments and businesses devote significant resources to preventing intrusions by malware. Malware comes in many forms, such as computer viruses, worms, trojan horses, spyware, keystroke loggers, adware, and rootkits. Some of the threats posed by malware are of such significance that they are described as cyber terrorism or industrial espionage.

Even when a host machine has security software installed, malware may nevertheless avoid detection by the security software. When this happens, the host machine is considered to be "compromised." In these instances, if a compromised host machine remains connected to the Internet after a malware intrusion, the malware can spread to network-adjacent host machines.

Operating systems include firewalls that, when enabled, restrict particular incoming and/or outgoing traffic to and/or from the host machine. Despite this capability, existing firewalls are not configured in such a way to address the aforementioned problem of a host machine becoming compromised by malware and allowing the malware to propagate to network-adjacent host machines through open Internet connections. Furthermore, most computer users are unsophisticated in terms of knowing how to create and/or modify firewall policies to achieve a desired result. Because of these factors, host machines remain vulnerable to security breaches and rapid spreading of malware.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1A:
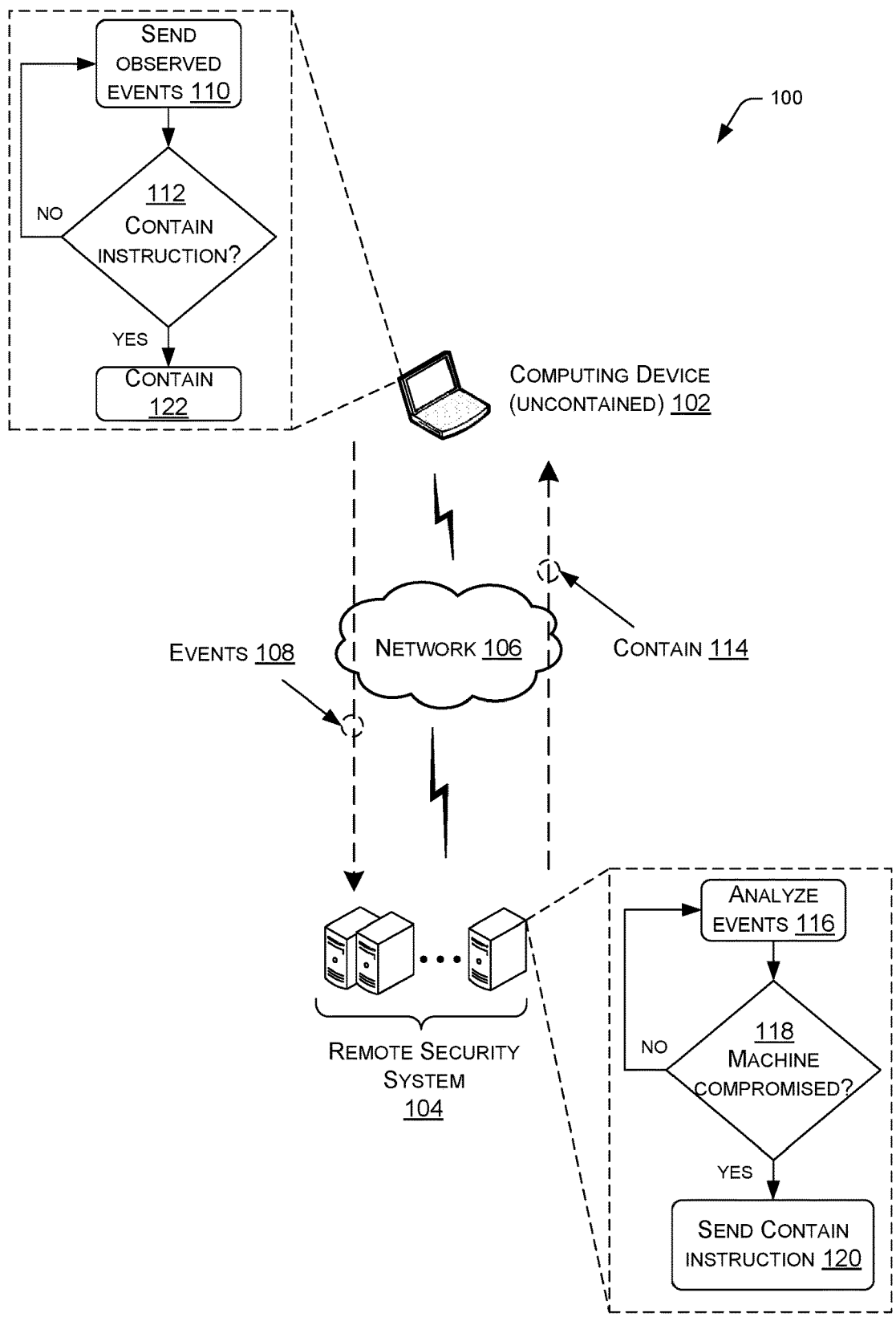
FIG. 1A illustrates an example network environment including a computing device in communication with a remote security system that is configured to remotely contain the computing device in response to a detected malware attack on the computing device, FIG. 1A representing a scenario before containment of the computing device.

Described herein, among other things, are techniques and systems for enabling and disabling network containment of a computing device that may have been compromised by malware (or malicious code). In particular, network containment of a computing device can be remotely enabled and/or disabled from a remote system (i.e., a system that is remotely located from the computing device and connected thereto over a computer network). By way of example, and not limitation, the techniques and systems disclosed herein are particularly useful for containing computing devices running a number of different operating systems, such as the Mac™ operating system, developed by Apple™, Inc. of Cupertino, Calif. or operating systems with similar characteristics.

A computing device may install, and subsequently execute a kernel-level security agent as part of a security service to monitor and record activity on the computing device in an effort to detect, prevent, and mitigate damage from, malware attacks. Upon installation on the computing device, the kernel-level security agent can observe events associated with activity on the computing device while a user is using the computing device, and the kernel-level security agent can send those observed events (or data associated with the observed events) to a remote security system implemented in the "Cloud" (the "remote security system" also being referred to herein as a "security service cloud"). At the remote security system, the received event data can be analyzed for purposes of detecting, preventing, and/or defeating malware attacks. Rather than using fixed signatures to make determinations and responses, the security architecture described herein provides a kernel-level security agent resident on the host computing device that observes and analyzes semantically-interesting events that occur on the host computing device, and interacts with a remote security system to enable a detection loop that is aimed at defeating all aspects of a malware attack.

When a malware attack is detected on a host computing device using the aforementioned detection loop, the remote security system can remotely enable containment of the potentially compromised computing device by sending a "contain" instruction to the computing device. The "contain" instruction, upon receipt at the computing device, causes the computing device to implement a locally-accessible firewall policy that disables network connectivity of the computing device in a manner according to the firewall policy. The firewall policy is locally-accessible because the kernel-level security agent is installed on the computing device with the firewall policy. Thus, when the computing device receives the "contain" instruction from the remote security system, the firewall policy can be accessed locally by the kernel-level security agent and implemented on the computing device to "contain" the computing device. Upon implementation and enforcement of the firewall policy, the operating system of the computing device denies particular outgoing data packets from, and incoming data packets to, the computing device, pursuant to the firewall policy.

In some embodiments, implementing the firewall policy on the host computing device includes the kernel-level security agent executing instructions to load a user-mode component in user mode of the computing device, and providing the firewall policy to the user-mode component. The user-mode component then invokes (or calls), from the user mode, an application programming interface (API) to implement the firewall policy, and the firewall policy is implemented in kernel mode of the computing device based at least in part on the API invoked from user mode. Utilizing the user-mode component of the kernel-level security agent to implement the firewall policy is useful for computing devices that run the Mac™ operating system or operating systems with similar characteristics, because the Mac™ operating system and those other operating systems may restrict the kernel-level security agent from implementing the firewall policy directly from kernel mode. That is, the approved API for implementing the firewall policy on a Mac™ operating system or operating system with similar characteristics may not be invoked by a call from the kernel mode, hence the utilization of the user-mode component to invoke the firewall API.

By disabling network connectivity of a potentially compromised computing device according to the techniques and systems described herein, potential damage caused by malicious code can be controlled and mitigated while the threat is defeated and the computing device "healed." In other words, the impact of malware on network-adjacent host machines can be prevented, or at least mitigated, by curtailing the spread of the malware to other machines. In addition, the techniques and systems described herein may effectively remove the ability of "adversaries" to communicate with the host computing device after containment is enabled, thereby mitigating further damage that can be inflicted by such adversaries. "Adversaries" is used herein to include, without limitation, any developer, builder, and/or operator of an attack infrastructure that develops exploits. Adversaries may include entities that conduct target reconnaissance, entities that execute the operation, entities that perform data exfiltration, and/or entities that maintain persistence in the network, and so on. Thus, "adversaries" can include numerous people (or software entities) that are all part of an "adversary" group.

FIG. 1A illustrates an example network environment 100 including a computing device 102 in communication with a remote security system 104. The remote security system 104 is configured to remotely contain the computing device 102 in response to a malware attack detected on the computing device 102. FIG. 1A represents a scenario before containment of the computing device 102.

As illustrated in FIG. 1A, the computing device 102 (sometimes called a "host computing device" or a "host machine") may interact with the remote security system 104 over a computer network 106. In some embodiments, the network 106 may include any one or more networks, such as wired networks, wireless networks, and combinations of wired and wireless networks. Further, the network 106 may include any one or combination of multiple different types of public or private networks (e.g., cable networks, the Internet, wireless networks, etc.). In some instances, the computing device 102 and the remote security system 104 communicate over the network 106 using a secure protocol (e.g., https) and/or any other protocol or set of protocols, such as the transmission control protocol/Internet protocol (TCP/IP).

Figure 3:
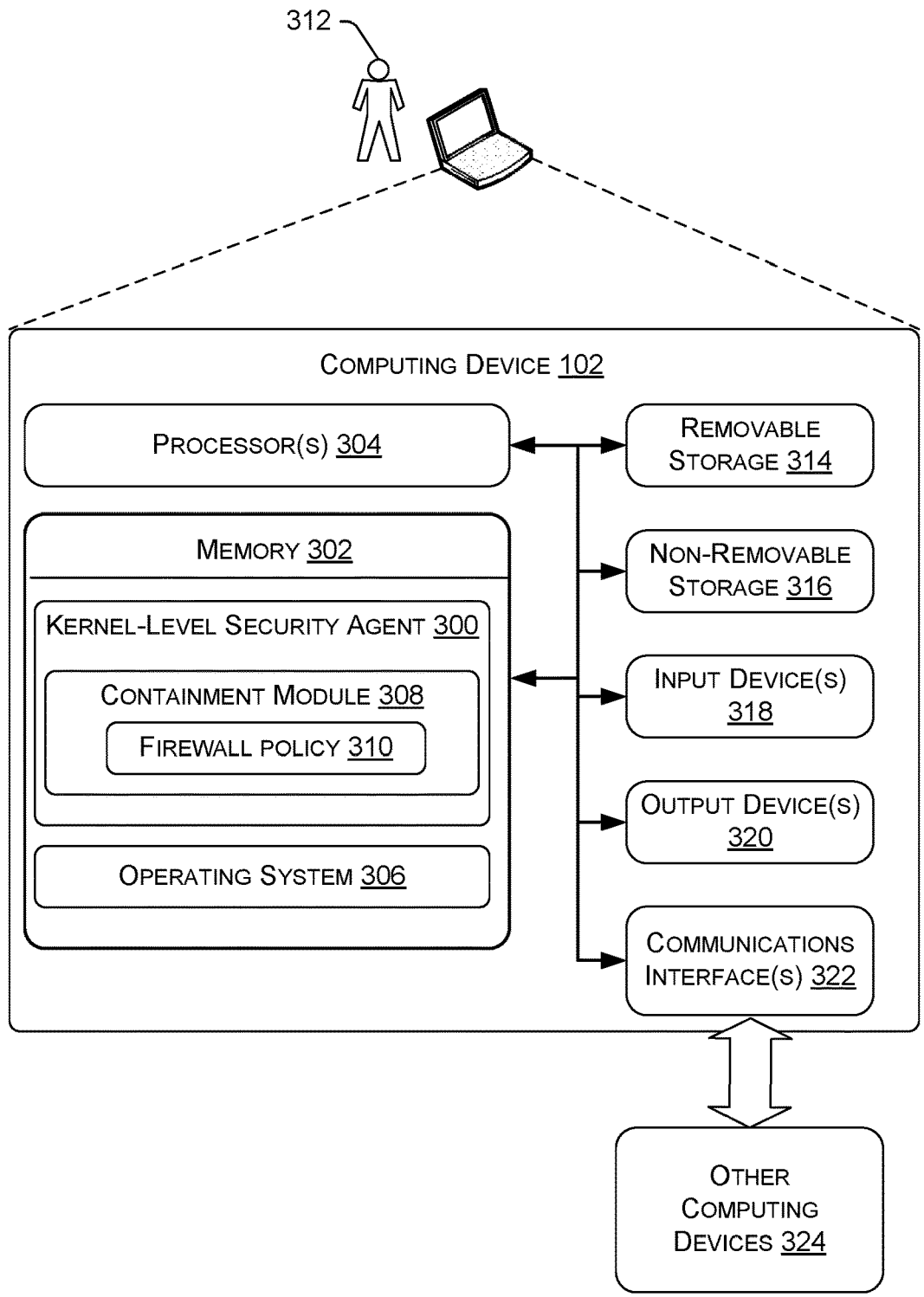
FIG. 3 illustrates an example block diagram of a computing device architecture, including, inter alia, a containment module to contain the computing device in response to an instruction from a remote security system.

An example architecture of the computing device 102 is described in more detail below with reference to FIG. 3. Referring briefly to FIG. 3, the computing device 102 may implement a kernel-level security agent 300, which is shown as being stored in memory 302 of the computing device 102 and executable by one or more processors 304 of the computing device 102. In some embodiments, the kernel-level security agent 300 may operate on the host computing device 102 as a virtual machine/shadow operating system that loads before the operating system 306 of the computing device 102. In an example, the operating system 306 of the computing device 102 is a Mac™ operating system or operating system with similar characteristics.

The computing device 102 may receive the kernel-level security agent 300 over the computer network 106 from the remote security system 104 by downloading the security agent 300 as a software package to be installed on the computing device 102. Furthermore, the kernel-level security agent 300 may include a containment module 308 with local access to a firewall policy 310, which can be implemented in order to activate network containment of the computing device 102, as described herein.

Together, the kernel-level security agent 300 of the computing device 102 and the remote security system 104 form a detection loop, which can be enabled by an agent architecture designed in accordance with the principles of the well-known OODA-loop (i.e., observe-orient-detect-act-loop). Accordingly, the kernel-level security agent 300 may include various additional components/modules (in addition to those shown in FIG. 3) for enabling this detection loop feature. For example, the kernel-level security agent 300 may include components known as "collectors" that receive notifications of semantically-interesting events 108 (e.g., file writes and launching executables) from host operating system hooks or filter drivers, from user-mode event monitors, or from threads monitoring log files or memory locations. Thus, the kernel-level security agent 300 may include additional components configured to observe events 108 (See FIG. 1A), determine actions to take based on those events 108, and/or send observed events 108 to the remote security system 104 for further analysis at the remote security system 104.

Returning again with specific reference to FIG. 1A, as shown at block 110, events 108 observed by the kernel-level security agent 300 may be sent over the computer network 106 to the remote security system 104, with or without further processing by the kernel-level security agent 300. For example, in some embodiments, the events 108 observed by the kernel-level security agent 300 may be filtered using configurable filters of the kernel-level security agent 300 and routed/dispatched to event consumers of the kernel-level security agent 300, such as correlators or actor components. Alternatively, the observed events 108 can be sent to the remote security system 104 without further processing on the computing device 102.

As shown at block 112 of FIG. 1A, as observed events 108 are sent to the remote security system 104, the kernel-level security agent 300 may monitor for the receipt of an instruction 114 (sometimes called a "contain instruction" 114) from the remote security system 104 to "contain" the computing device 102. This contain instruction 114 may be sent via an event provided by the remote security system 104 to the kernel-level security agent 300 of the computing device 102. In response to the kernel-level security agent 300 processing the contain instruction 114, network containment of the computing device 102 is triggered (or activated). So long as this contain instruction 114 is not received by the kernel-level security agent 300 of the computing device 102, the kernel-level security agent 300 can continue to execute on the computing device 102 by observing and sending events 108 to the remote security system 104 while the computing device 102 is powered on and running.

Meanwhile, as shown at block 116 of FIG. 1A, upon receipt of the events 108 from the computing device 102 at the remote security system 104, various components of the remote security system 104 may analyze the received events 108, and, at block 118, the remote security system 104 may determine if the computing device 102 is potentially compromised. Determining whether the computing device 102 is potentially compromised may include determining whether the events 108 observed by the kernel-level security agent 300 are associated with malicious code. Although this determination at block 118 is shown as being performed at the remote security system 104, it is to be appreciated that the determination at block 118 can, alternatively, be done at the computing device 102 by the kernel-level security agent 300. For example, the kernel-level security agent 300 may analyze observed events 108 to determine if the events 108 are associated with malicious code, and send a notification of this determination to the remote security system 104. In either case, so long as the computing device 102 is determined to be operating without malicious code (i.e., not compromised), the remote security system 104 may continue to receive and analyze events at block 116 of FIG. 1A.

In response to determining that the computing device 102 is compromised (e.g., received events 108 are associated with malicious code), the remote security system 104 can send a contain instruction 114 over the computer network 106 to the computing device 102, as shown at block 120 of FIG. 1A. The kernel-level security agent 300 of the computing device 102 may receive this contain instruction 114, as shown by the "yes" path from block 112 to block 122 of FIG. 1A. The receipt of this contain instruction 114 by the kernel-level security agent 300 causes the computing device 102 to enable (activate, trigger, etc.) network containment at block 122. To enable network containment on the computing device 102, the kernel-level security agent 300 can instruct the containment module 308 to implement the firewall policy 310 included with the kernel-level security agent 300 when the security agent 300 was previously installed on the computing device 102. Upon enforcement of the firewall policy 310, a firewall 124 (See FIG. 1B) of the computing device 102 denies outgoing data packets from, and incoming data packets to, the computing device 102 that would have been allowed prior to the implementing of the firewall policy 310.

Figure 1B:
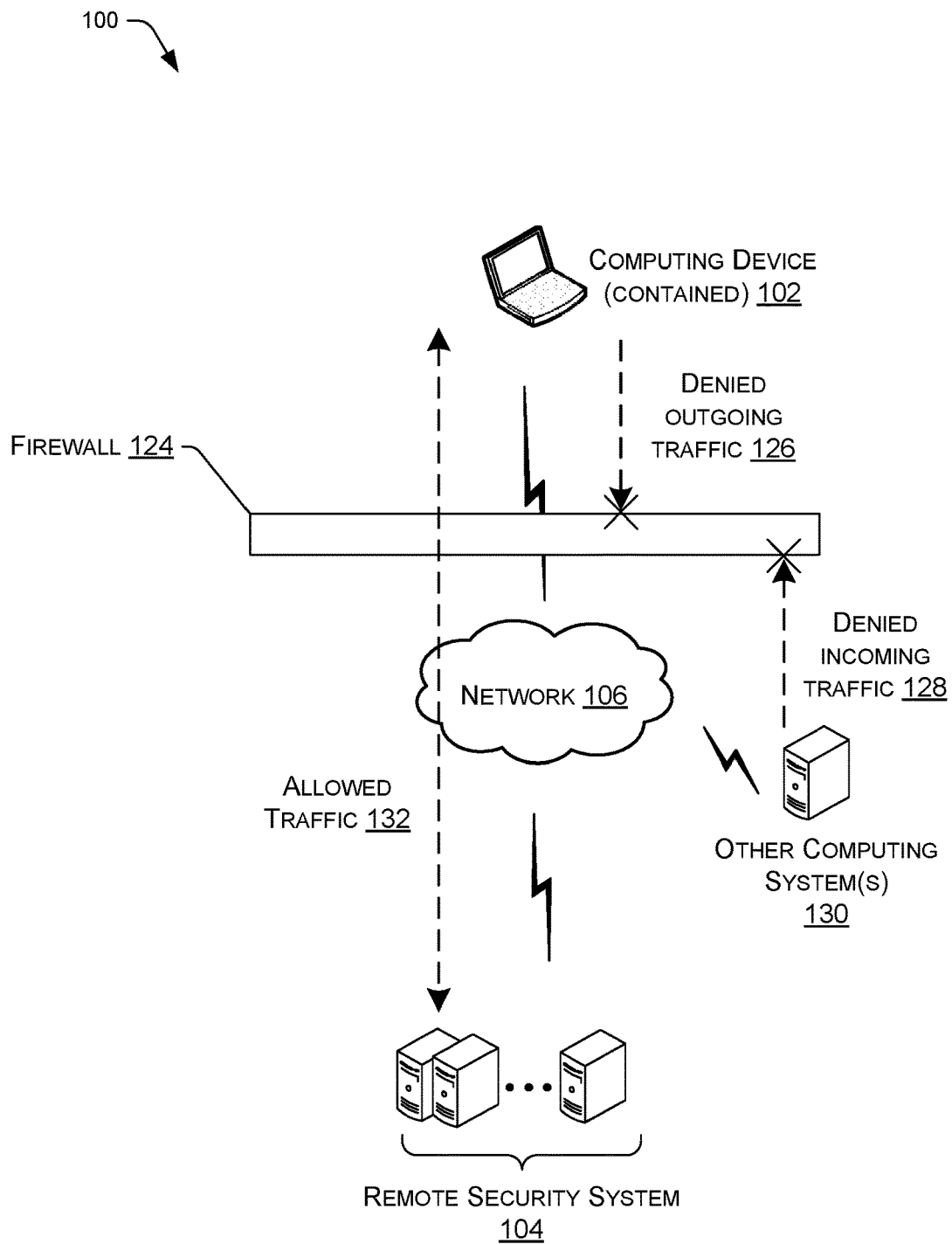
FIG. 1B illustrates the example network environment of FIG. 1B, but in a scenario after containment of the computing device.

With specific reference to FIG. 1B, this post-containment scenario is now described. In FIG. 1B, the firewall 124 of the computing device 102 can be utilized to implement the firewall policy 310 that is accessible to the kernel-level security agent 300 of the computing device 102. As shown in FIG. 1B, when the kernel-level security agent's 300 firewall policy 310 is enforced to contain the computing device 102, the firewall 124 denies outgoing traffic 126 (i.e., outgoing data packets 126) from the computing device 102, and denies incoming traffic 128 (i.e., incoming data packets 128) to the computing device 102, where such outgoing traffic 126 and incoming traffic 128 would have been allowed prior to the implementing of the firewall policy 310. For example, FIG. 1B shows how one or more other computing systems 130 can be connected to the computer network 106. One of these other computing systems 130 may represent, for example, a search engine website that a user of the computing device 102 may commonly visit to search for items on the Internet. In FIG. 1A, before network containment, the computing device 102 may have been used by a user of the computing device 102 to enter a Uniform Resource Locator (URL) of the search engine website so that outgoing traffic 126 and incoming traffic 128 can be sent/received by the computing device 102, from the other computing system 130 that serves the search engine website to the computing device 102. However, in FIG. 1B, after network containment when the firewall policy 310 is implemented and enforced in response to the contain instruction 114, the firewall 124 of the computing device 102 may deny outgoing data packets 126 to, and incoming data packets 128 from, the other computing system 130 that serves the search engine website. A user of the computing device 102 may experience this as a browser error that does not resolve upon entering the URL of the search engine website. This type of network containment can be enabled on the computing device for multiple other computing systems 130, the search engine website being merely one example type of computing system 130 that may be unable to communicate with the computing device 102 after network containment is enabled.

In some embodiments, the firewall 124, may deny all traffic to and from the computing device 102 with respect to other computing systems 130 having remote network addresses (e.g., Internet Protocol (IP) addresses) that are not otherwise specified in the firewall policy 310 as an exception for allowed traffic 132. Thus, according to some embodiments, if the firewall policy 310 does not specify any approved remote network addresses that the computing device 102 is allowed to communicate with, the firewall 124, in enforcing the firewall policy 310, may blacklist all external device communications by denying all outgoing traffic 126 from, and incoming traffic 128 to, the computing device 102. This is an extreme implementation of network containment where the computing device 102 is cutoff from communicating with the outside world.

In some embodiments, however, network containment can be implemented on the computing device 102 in a manner that allows some communication to/from the computing device 102 with the outside world over the network 106. For example, the firewall policy 310 can specify exceptions for remote network addresses that are allowed to communicate with the computing device 102 after containment is enabled/initiated and while the computing device 102 remains contained. For example, as shown in FIG. 1B, the firewall 124 allows some traffic 132 (i.e., allowed data packets 132) to and from the remote security system 104 so that a communication channel remains open and usable between the computing device 102 and the remote security system 104, even when the computing device 102 is "contained" (or cutoff from communicating with the other computing system(s) 130 besides the remote security system 104). To accomplish this result, the firewall policy 310 can specify at least one remote network address (e.g., a remote IP address) associated with the remote security system 104, and may specify an action to allow outgoing data packets 132 to, and incoming data packets 132 from, the remote security system 104, which may be associated with the at least one remote network address that can be specified in the firewall policy 310.

While disconnecting the host computing device 102 from the other computing device(s) 130 may limit (or mitigate) the potential damage from malicious code propagating to the other computing device(s) 130, keeping an open line of communication with the remote security system 104 may provide one or more open network channels for the remote security system 104 to remotely work on diagnosing and healing the compromised machine 102. For example, the remote security system 104 can monitor the computing device 102, and messages and data can be sent between computing device 102 and the remote security system 104. For example, during containment of the computing device 102, the remote security system 104 can send a new version of the kernel-level security agent 300 to the computing device 102 for installation thereon as a means of "healing" the compromised computing device 102. In another example, during containment of the computing device 102, the remote security system 104 can send an instruction to the computing device 102 to perform a remediation action to counter the malicious code on the computing device 102. Such a remediation action can include, without limitation, halting a process associated with malicious code, removing one or more executables, files, or registry keys, or deceiving the malicious code by having it write to a dummy file rather than an operating system file, having it read falsified data, or falsifying a transmission associated with the malicious code. Furthermore, in the event that the computing device 102 was mistakenly identified as having been compromised when, in reality, the computing device 102 was not compromised, the open line of communication to the remote security system 104 may allow a user of the computing device 102 to message the remote security system 104 (which may include an operations center with support personnel) that his/her computing device 102 has been "locked down" and they don't understand why. If an analyst at the remote security system 104 investigates further into the situation, he/she may realize the mistake and free the computing device 102 from containment by sending an instruction to the computing device 102 to free the computing device 102 from network containment.

During containment, as shown in FIG. 1B, any potential damage from the malicious code on the computing device 102 can be controlled and mitigated while the malware issue is assessed and the computing device 102 is "healed." Thereby, the impact of malware on other host machines that are network-adjacent to the computing device 102 can be prevented, or at least mitigated, by curtailing the spread of the malware the other machines. In addition, "adversaries" can be cut off (or prevented) from communicating with the host computing device 102 while the computing device 102 is contained, thereby mitigating further damage that can be inflicted by such adversaries.

At any time, such as after the malware (malicious code) has been defeated, the remote security system 104 can send an instruction to deactivate the containment of the computing device 102, which reverts the computing device 102 to its original state of having the network connectivity it had prior to the implementation of the firewall policy 310.

Figure 2:
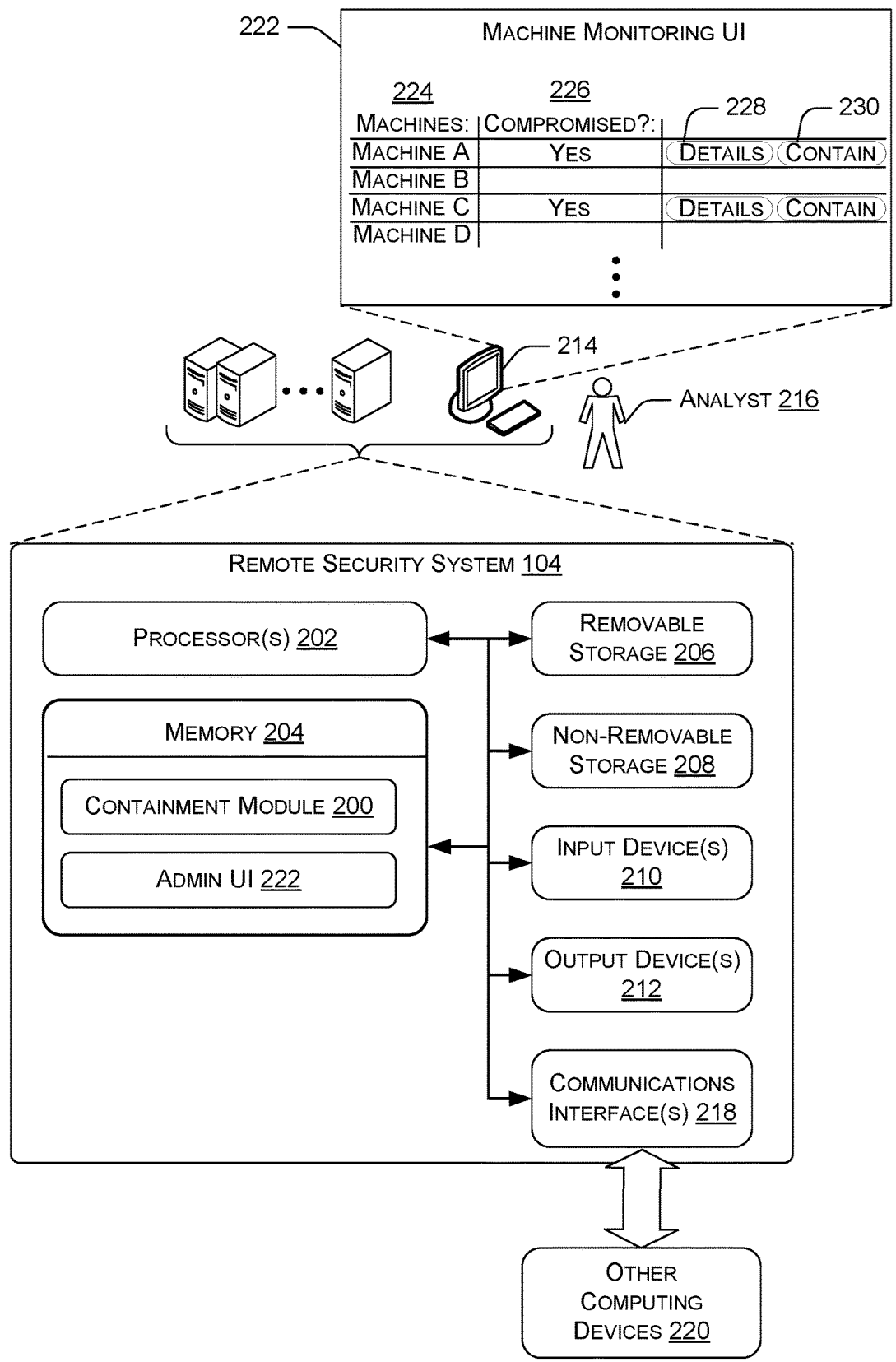
FIG. 2 illustrates an example block diagram of a remote security system architecture, including, inter alia, a containment module to remotely contain computing devices that have potentially been compromised.

FIG. 2 illustrates an example block diagram of a remote security system 104 architecture, as introduced in FIGS. 1A and 1B, including, inter alia, a containment module 200 to remotely contain individual computing devices (or groups of computing devices), such as the computing device 102. In one implementation, the remote security system 104 may include a plurality of computing devices working in communication, such as a cloud computing network of nodes. When implemented on multiple computing devices, the remote security system 104 may distribute the modules and data of the remote security system 104 among the multiple computing devices. In some implementations, one or more of the computing device(s) of the remote security system 104 represents one or more virtual machines implemented on one or more computing devices.

As shown in FIG. 2, the remote security system 104 may include one or more processors 202 and one or more forms of computer-readable memory 204. The processor(s) 202 may be or include any sort of processing unit, such as a central processing unit (CPU) or a graphic processing unit (GPU). The remote security system 104 may also include additional storage devices. Such additional storage may include removable storage 206 and/or non-removable storage 208.

The remote security system 104 may further include input devices 210, including, without limitation, physical buttons (e.g., keyboard or keypad), a microphone, pointing devices (e.g., mouse, pen, stylus, etc.), or any other suitable input device(s) 210 coupled communicatively to the processor(s) 202 and the computer-readable memory 204. The remote security system 104 may further include output devices 212, including, without limitation, a display, speakers, or any other suitable output device(s) 212 coupled communicatively to the processor(s) 202 and the computer-readable memory 204. For example, FIG. 2 shows that the remote security system 104 may include, in addition to one or more server computer systems, a computer system 214 that includes a display (i.e., an output device 212) and an input device 210 (e.g., a keyboard and mouse). Such a computer system 214 may be used by an analyst 216 for monitoring multiple host computing devices, such as the computing device 102.

The remote security system 104 may further include a communications interface(s) 218 that allows the remote security system 104 to communicate with other computing devices 220. The other computing devices 220 may include multiple host computing devices, such as the computing device 102, which utilize the remote security system 104 as part of a security service. Accordingly, the communications interface(s) 218 may allow the remote security system 104 to send and receive communications through one or both of the network 106 or other networks. The communications interface(s) 218 may also support both wired and wireless connection to various networks, and may interface with any one or more protocol stacks, such as a TCP/IP stack, device drivers, and any other modules or data that enable the remote security system 104 to send and receive data over network 106. In this manner, the remote security system 104 can remotely enable and/or disable network containment of individual computing devices 102.

In various embodiments, the computer-readable memory 204 generally includes both volatile memory and non-volatile memory (e.g., RAM, ROM, EEPROM, Flash Memory, miniature hard drive, memory card, optical storage, magnetic cassettes, magnetic tape, magnetic disk storage or other magnetic storage devices, or any other medium). The computer-readable memory 204 may also be described as computer storage media or non-transitory computer-readable media, and may include volatile and non-volatile, removable and non-removable media implemented in any method or technology for storage of information, such as computer readable instructions, data structures, program modules, or other data. Computer-readable memory 204, removable storage 206 and non-removable storage 208 are all examples of computer-readable storage media and/or non-transitory computer-readable media. Computer-readable storage media (or non-transitory computer-readable media) include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, and the like, which can be used to store the desired information and which can be accessed by the remote security system 104. Any such memory 204 may be part of the remote security system 104.

In general, the remote security system 104 may be configured to communicate with the kernel-level security agent 300 of the computing device 102, and to evaluate "interesting" events 108 identified by the kernel-level security agent 300. For example, the remote security system 104 may be configured to receive events 108 and data related to such events 108, such as forensic data associated with observed events 108. Upon receiving notification of an interesting event 108 from a kernel-level security agent 300, the remote security system 104 may determine if related notifications have been received from other kernel-level security agents 300 of other computing devices 102. Also or instead, the remote security system 104 may evaluate the interesting event 108 based on one or more rules or heuristics. The remote security system 104 may determine that an interesting event 108 may be associated with malicious code based on these determinations and evaluations and may, in response, perform any or all of generating an event and providing the event to computing device 102 (e.g., for containment purposes, and/or diagnostic, healing, or other purposes), sending updates (e.g., a new version of the kernel-level security agent 300, new firewall policies 310, etc.), instructing the computing device 102 to perform a remediation action to heal the computing devices 102 or otherwise counter malicious code. The remote security system 104 may also maintain and utilize one or more situational models, such as models specific to individual computing devices 102, to types of computing devices, to entities, or to a generic device to determine appropriate actions to take. The remote security system 104 may update these models based on the received notifications and utilize the models in analyzing the interesting events 108.

The remote security system 104 may be configured to facilitate "healing" of the computing devices 102 by, for example, determining appropriate remediation actions for events 108 determined to be associated with malicious code. For example, the remote security system 104 may determine that an appropriate remediation action is to halt a process associated with malicious code, to remove one or more executables, files, or registry keys, or to deceive malicious code by having it write to a dummy file rather than an operating system file, having it read falsified data, or falsifying a transmission associated with the malicious code. The remote security system 104 may then instruct the kernel-level security agent 300 of a computing device 102 to perform the determined remediation action. In some embodiments, the remote security system 104 may provide the instructions via an event provided to the kernel-level security agent 300.

FIG. 2 further illustrates an administrative user interface (UI) 222 to enable an analyst 216 (also referred to as an administrator, support personnel, etc.) associated with the remote security system 104 to view notifications of observed events 108, alerts pertaining to machines 102 that have been compromised, and make decisions regarding appropriate responses to those events 108 and alerts. The administrative UI 222 may interact with the containment module 200 stored in the memory 204 to enable features and functionality for containing host machines (computing devices 102). An example of the administrative UI 222 is shown in FIG. 2, which presents multiple "machines" corresponding to computing devices, like the computing device 102, that are currently being monitored via the detection loop between resident kernel-level security agents 300 and the remote security system 104, as described herein. The example administrative UI 222 shows the multiple machines in column 224 of the UI 222 presented in a list. Presenting host machines 102 in this manner is merely one example way of presenting machines 102 in the administrative UI 222, and the example administrative UI 222 is not limited to this manner of presenting currently-monitored machines 102. For instance, groups of host machines 102 can be presented in the administrative UI 222 based on any grouping criteria, including groupings by "customer." A "customer," in this context, may represent a customer of a security service, such as an enterprise customer (or business) that provides multiple host machines 102 to its employees, and these multiple machines 102 can be presented in the administrative UI 222 so that the analyst 216 can view those machines 102 in any suitable organizational framework.

The administrative UI 222 can present an alert, such as the alerts shown in column 226, indicating that a particular machine(s) 102 (e.g., Machine A and Machine C) have been potentially compromised. These alerts may be based on the respective events 108 observed by the respective kernel-level security agents 300 executing on those machines 102, which events 108 may have been determined to be associated with malicious code. It is to be appreciated that the administrative UI 222 may also enable the analyst 216 to examine events 108 and associated data without first providing an alert.

The administrative UI 222 may further present a selection element 228 (e.g., a "Details" button) that, upon selection, provides further details pertaining to the alert in column 226, indicating a particular machine 102 has been compromised. By selecting the "details" element/button 228 for a particular machine/device 102, the analyst 216 can "drill down" on detailed information as to the particular observed events 108, processes executing on the computing device 102 relating to those events 108, and/or other details about the potentially compromised machine 102.

The administrative UI 222 may further present a selection element 230 (e.g., a "Contain" button, or "Contain this Machine" button) that, upon selection, causes the containment module 200 of the remote security system 104 to send a contain instruction 114 to the computing device 102 in question. This is an example of a human-driven containment process that can be carried out by the analyst 216 selecting the "contain" element/button 230 on the administrative UI 222 when the analyst 216 himself/herself determines to contain the host computing device 102. In this manner, the analyst 216 can be alerted to a potentially compromised computing device 102, and can make the decision as to whether the computing device 102 is to be contained or not. In this example, there may be instances where the analyst 216 notices an alert of a potentially compromised machine 102 in the administrative UI 222, but after further inspection (e.g., by selecting the "details" element/button 228 and viewing further details about the activity on the computing device 102), the analyst 216 may determine, above some threshold level of confidence, that the machine 102 is actually, or most likely, not compromised by malware, and may decide to refrain from containing the machine 102.

In other embodiments, the containment module 200 of the remote security system 104 may be configured to determine to contain a computing device 102 automatically (i.e., without human intervention), and may send the contain instruction 114 to the computing device 102 without human intervention as well. For this automated network containment implementation, the containment module 200 of the remote security system 104 may utilize a machine learning model (or algorithm) that is trained on a past corpus of events 108 and detected malware attacks/intrusions on computing devices 102 that utilized the remote security system 104. Such a machine learning model is configured to process events 108 received from a computing device 102 as input, and to generate an output that is utilized by the containment module 200 to automatically determine whether to contain the computing device 102 or not.

Machine learning generally involves processing a set of examples (called "training data") in order to train a machine learning model(s). A machine learning model, once trained, is a learned mechanism that can receive new data as input and estimate or predict a result as output. For example, a trained machine learning model can comprise a classifier that is tasked with classifying unknown input (e.g., an unknown events 108) as one of multiple class labels (e.g., a class label of "compromised" vs. "uncompromised", "contain" vs. "do not contain", etc.). Any single machine learning model, or an ensemble of base-level machine learning models, can be used for this purpose, including, without limitation, tree-based models, support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of machine learning models whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

The machine learning model output can be utilized to determine whether to contain a particular computing device 102 based at least in part on the observed events 108, as described herein. In either case (i.e., in either the human-driven case or the automated (machine learning) case), the administrative UI 222 may present information, for consumption by the analyst 216, regarding which machines 102 have had containment initiated, which machines are currently contained, and/or which machines have not had containment initiated, or are no longer contained. For example, after the analyst 216 selects the "contain" element/button 230 for Machine A, the administrative UI 222 may be updated to present information that Machine A is currently being contained, and after containment is successfully completed, that Machine A is currently contained. This way, the analyst 216 may understand which host machines 102 are currently contained and which are not.

In some instances, any or all of the devices and/or components of the remote security system 104 may have features or functionality in addition to those that FIG. 2 illustrates. For example, some or all of the functionality described as residing within any or all of the devices of the remote security system 104 may reside remotely from that/those device(s), in some implementations.

FIG. 3 illustrates an example block diagram of an architecture of a host computing device 102, introduced in FIGS. 1A and 1B, including, inter alia, a containment module 308 to contain the computing device 102 in response to an instruction from a remote security system 104. In various embodiments, the computing device 102 may be or include any suitable type of computing device 102, including, without limitation, a mainframe, a work station, a personal computer (PC), a laptop computer, a tablet computer, a personal digital assistant (PDA), a cellular phone, a media center, an embedded system, or any other sort of device or devices. A user 312 may be associated with the computing device 102, and the user 312 may have registered for security services provided by a service provider of the remote security system 104.

The computing device 102 may include components that may be described similarly to those described with respect to the remote security system 104 of FIG. 2. For example, the processor(s) 304 may be or include any sort of processing unit, such as a CPU or a GPU. The computing device 102 may also include additional storage devices, such as removable storage 314 and/or non-removable storage 316. The memory 302, the removable storage 314, and the non-removable storage 316 are all examples of computer-readable storage media or non-transitory computer-readable media, as described in more detail with reference to FIG. 2.

The computing device 102 may further include one or more input devices 318 and one or more output devices 320, which may be similar to those described with reference to FIG. 2. For example, the computing device 102 may include a display (i.e., an output device 320) and an input device 318 (e.g., a touchscreen, keyboard, and/or mouse).

The computing device 102 may further include a communications interface(s) 322 that allows the computing device 102 to communicate with other computing devices 324. The other computing devices 324 may include the remote security system 104 and the other computing system(s) 130. The communications interface(s) 322 may be similar to the description of the communications interface(s) in FIG. 2.

In general, the computing device 102 may be configured to communicate with the remote security system 104. For example, the kernel-level security agent 300 may be configured to observe to operate as a virtual machine/shadow operating system, to load before the operating system 306 of the computing device 102 (e.g., by loading very early in the boot-time of the computing device 102, such as by some of the first few dozen instructions), and to observe events 108, determine appropriate action(s) to take based on those events 108, and send the events 108, or data related to the events 108, to the remote security system 104 for further processing to determine whether the computing device 102 has been compromised by malware. The kernel-level security agent 300 may also be configured to receive configuration updates from the remote security system 104.

The operating system 306, which may be a Mac™ operating system 306 or operating system with similar characteristics, may include hooks or filter drivers that allow other processes, such as the kernel-level security agent 300 to receive notifications of the occurrence or non-occurrence of events 108 such as file creates, reads and writes, launching of executables, etc. Thus, the kernel-level security agent 300 can observe events 108 associated with one or more processes, such as kernel mode processes. Events 108 may include both actions performed by processes and non-occurrence of expected actions. For example, the kernel-level security agent 300 may register with a hook or filter driver offered by the operating system 306 to receive notifications of the occurrence or non-occurrence of certain events 108, such as file creates, reads and writes, and loading executables, and/or the kernel-level security agent 300 may monitor locations in the memory 302 or log files, or spawn a thread to do so, observing events 108 associated with the log files or memory locations.

As mentioned, the containment module 308 of the kernel-level security agent 300 may have access to a firewall policy 310 that is to be implemented, upon receipt of a containment instruction 114 from the remote security system 104, for enabling network containment of the computing device 102 so that outgoing data packets 126 from, and incoming data packets 128 to, the computing device 102 are denied in order to "contain" the computing device 102 with respect to its network connections to all or at least some of the outside world.

The firewall policy 310 can be specified in any suitable manner to indicate remote network addresses (e.g. IP addresses) and firewall actions (e.g., deny, allow, etc.) that are to be taken with respect to traffic that is sent to, and received from, those remote network addresses. In some embodiments, the firewall policy 310 specifies properties that are to be examined in the packet header of any outgoing/incoming data packet with respect to the computing device 102, such properties including, without limitation, a local IP address, a remote IP address (or a source IP address and a destination IP address), an IP protocol (e.g., Transmission Control Protocol (TCP) or User Datagram Protocol), the local TCP or UDP port, and the remote TCP or UDP port (or the source/destination TCP or UDP ports). The firewall policy 310 can also specify an action to be taken, which may include deny action or an allow action with respect to data packets that include property values specified in the firewall policy 310. In some embodiment, the implementation of the firewall policy 310 may cause all data packets to be denied unless they meet an exception specified in the firewall policy 310 for the data packet to be allowed to be sent/received from/by the computing device 102.

The containment module 308 of the kernel-level security agent 300 may also be configured to receive a whitelist from the remote security system 104, the whitelist including one or more remote network addresses (e.g., IP addresses) to which the computing device 102 is allowed to send data packets, and from which the computing device 102 is allowed to receive data packets, during containment. This whitelist can be received with the contain instruction 114, or in an entirely separate communication in parallel with the contain instruction 114. In some embodiments, the whitelist may be received after the contain instruction 114 in response to a command provided by an analyst of the remote security system 104.

Upon receiving the whitelist from the remote security system 104, the containment module 308 of the computing device 102 may dynamically update the firewall policy 310 to specify the one or more remote network addresses in the received whitelist as an exception to allow outgoing data packets 132 to, and incoming data packets 132 from, one or more computer systems associated with the one or more remote network addresses in the received whitelist.

The containment module 308 may also be configured to send a current containment status to the remote security system 104 to notify the remote security system 104 and/or an analyst 216 of the system 104 regarding the current containment status of the computing device 102. The containment module 308 may also be configured to receive notifications from the remote security system 104 (e.g., a notification that the computing device 102 has been contained), and to display those notifications on a display of the computing device 102. In some embodiments, a notification may be displayed on a display of the computing device 102 that informs the user 312 about contact information (e.g., a phone number, email address, etc.) of support personnel at the remote security system 104 to contact about the current network containment of the computing device 102.

In some embodiments, the containment module 308 may be configured to keep the computing device 102 contained even in circumstances where the connection to the remote security system 104 is severed (or disconnected). In addition, the containment module 308 may be configured to keep the computing device 102 contained after a reboot, shutdown, and/or a system crash of the computing device 102.

To free the computing device 102 from being contained, the containment module 308 may receive an instruction from the remote security system 104 to "un-contain" the computing device 102. This may be received in response to an analyst 216 at the remote security system 104 selecting an element in the administrative UI 222 to "un-contain" the device 102 and restore network connectivity to other computing systems 130 with which the computing device 102 was prevented from communicating during the containment.

In some instances, any or all of the devices and/or components of the computing device 102 may have features or functionality in addition to those that FIG. 3 illustrates. For example, some or all of the functionality described as residing within any or all of the devices of the computing device 102 may reside remotely from that/those device(s), in some implementations.

Figure 4:
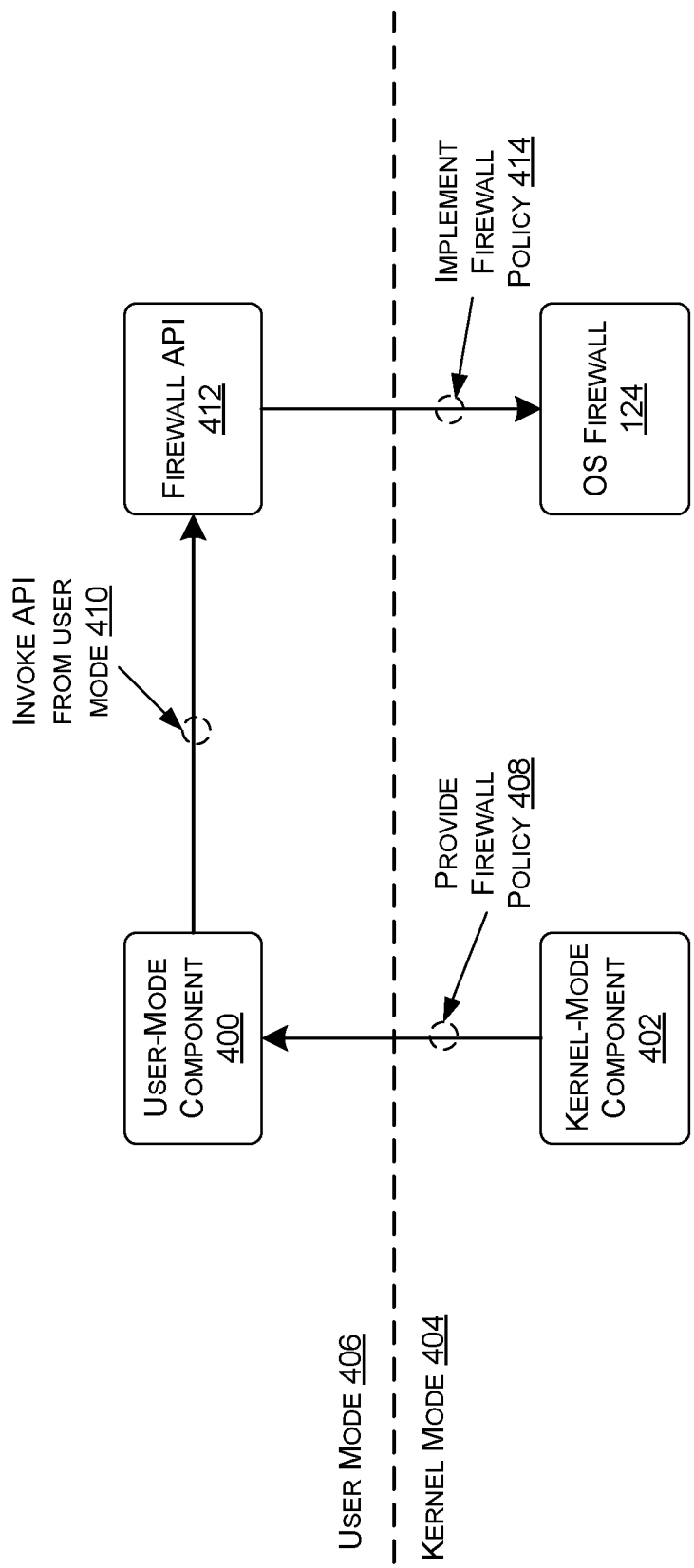
FIG. 4 is a diagram of an example technique for implementing a firewall policy to contain a computing device via a user-mode component of a kernel-level security agent executing on the computing device.

FIG. 4 is a diagram of an example technique for implementing a firewall policy 310 to contain a computing device 102 via a user-mode component 400 of a kernel-level security agent 300 executing on the computing device 102. FIG. 4 illustrates how the kernel-level security agent 300 may include a kernel-mode component(s) 402 in a kernel mode 404 of the computing device 102 and a user-mode component(s) 400 in a user mode 406 of the computing device 102. The kernel mode 404 and user mode 406 correspond to protection domains—also known as rings—that protect data and functionality of the computing device 102 from faults and malware. Typically, a user mode, such as user mode 406, is associated with the outermost ring and the least level of privileges to access memory and functionality. This ring is often referred to as "ring 3" and includes many application processes. A kernel mode, such as kernel mode 404, is associated with an inner ring (sometimes the innermost ring, although in modern computing devices there is sometimes an additional level of privilege, a "ring −1") and a higher level of privileges to access memory and functionality. This ring is often referred to as "ring 0" and typically includes operating system processes.

As its name implies, the kernel-level security agent's 300 functionality is, in large-part, kernel-resident, meaning that much of its functionality is carried out by the kernel-mode component 402 in the kernel mode 404 of the computing device 102. In this sense, very limited functionality of the kernel-level security agent 300 may operate in the user mode 406 of the computing device 102. FIG. 4 shows an example of the firewall implementation functionality of the kernel-level security agent 300 that involves invoking a user-mode component 400 of the kernel-level security agent 300.

The kernel-mode component 402 of the security agent 300 may, for example, include the firewall policy 310 that is to be written to the operating system 306 firewall 124. To implement this firewall policy 310, the kernel-mode component 402 may execute instructions to load the user-mode component 400 of the security agent 300 in the user mode 406 of the computing device 102, and may provide 408 the firewall policy 310 to the user mode component 400 in order to tell the user-mode component 400 which firewall rules to write.

The user mode component 400 then invokes 410 an application programming interface (API) 412 to implement the firewall policy 310. In a Mac™ operating system 306 or operating system with similar characteristics, the kernel-mode component 402 of the security agent 300 may be unable to call the firewall API 412 directly from the kernel mode 404, so the user-mode component 400 is utilized to call the firewall API 412 from the user mode 406 of the computing device 102. The firewall policy 310 is then implemented 414 in the kernel mode 404 by the operating system 306 firewall 124 based at least in part on the firewall API 412 that was invoked from the user mode 406 by the user-mode component 400 of the security agent 300.

Thus, a configuration of the kernel-level security agent 300 can be maintained by the kernel-mode component 402 thereof, and this configuration can specify the user-mode component 400 that is to be loaded to implement the firewall policy 310 from the user mode 406 by calling/invoking the supported firewall API 412 from the user mode 406.

In some embodiments, the instructions transmitted across the kernel mode 404/user mode 406 demarcation are transmitted via an input/output (I/O) mechanism of the kernel-level security agent 300, such as a ring buffer for transmitting data between protection domains. In some embodiments, such an I/O mechanism is not a component of the kernel-level security agent 300 but, rather, is part of the other modules and data of the computing device 102.

It is to be appreciated that, although the security agent 300 may be configured to utilize a user-mode component, such as the user-mode component 400, to implement the firewall policy 310 from the user mode 406 of the computing device 102, the security agent 300, in the alternative, may be configured to utilize a kernel-mode component, such as the kernel-mode component 402, to implement the firewall policy 310 from the kernel mode 404 of the computing device 102, without reliance on a user-mode component. That is, the kernel-mode component 402 may act as a firewall configuration component instead of the user-mode component 400.

The processes described herein are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 5:
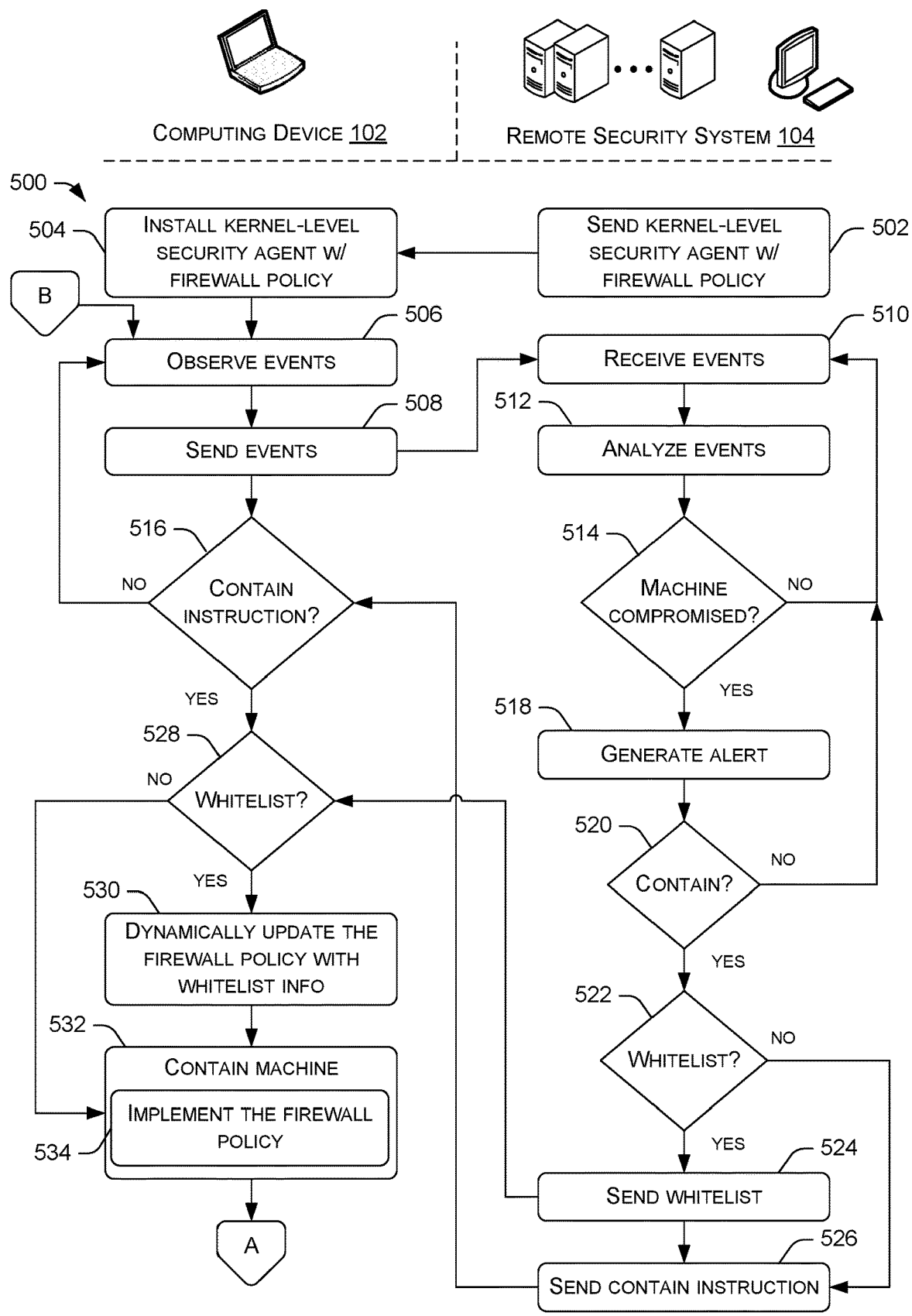
FIG. 5 illustrates an example process for containing a computing device upon detecting that the computing device has been compromised.

FIG. 5 illustrates an example process 500 for containing a computing device 102 upon detecting that the computing device 102 has been compromised. The process 500 can be implemented in part by the kernel-level security agent 300 of the computing device 102, and in part by the remote security system 104, as shown by the blocks underneath those respective systems in FIG. 5. The process 500 is described, by way of example, with reference to the previous figures.

At 502, the remote security system 104 may send a version of a kernel-level security agent 300 with a firewall policy 310 over a computer network 106 to the computing device 102. This may represent an initial installment of the kernel-level security agent 300 when a user signs up for security services from a service provider of the remote security system 104.

At 504, the computing device 102 may receive and install the kernel-level security agent 300 on the computing device with the firewall policy 310. At this point, the operating system 306 of the computing device 102 refrains from implementing the firewall policy 310 unless and until a contain instruction 114 is received from the remote security system 104. The kernel-level security agent 300 and/or the firewall policy 310 can be updated in a similar manner, as needed, by receiving and downloading updates from the remote security system 104.

At 506, the kernel-level security agent 300 (and specifically the kernel-mode component 402 in kernel mode 404) may observe events 108 associated with activity on the computing device 102. Such activity may include one or more processes (e.g., user mode 406 applications) executing/running on the computing device 102 as part of the user 312 utilizing the device 102 for everyday computing tasks, such as email applications, web browsing, file creation/modification, and so on.

At 508, the kernel-level security agent 300 may send the observed events 108, over a computer network 106, to the remote security system 104. At 510, the remote security system 104 may receive, over the computer network 106 and from the computing device 102, the events 108 associated with the activity on the computing device 102.

At 512, the remote security system 104 may analyze the events 108 received from the computing device 102 that are associated with the activity on the computing device 102, as described herein.

At 514, based on the analysis of the events 108 at block 512, the remote security system 104 may determine whether the events 108 it received are associated with malicious code (i.e., whether the computing device 102 is potentially compromised). If the determination is negative at block 514 (i.e., that the computing device 102 is not compromised), the process 500 follows the "no" route from block 514 back to block 510 to receive and analyze more events 108 to iteratively make this determination as more events 108 are received.

Meanwhile, at 516, the kernel-level security agent 300 of the computing device 102 monitors for receipt of a contain instruction 114 from the remote security system 104. Unless and until such a contain instruction 114 is received from the remote security system 104, the process 500 follows the "no" route from block 516 back to block 506 where more events 108 associated with activity on the computing device 102 are observed and sent to the remote security system 104.

If, at block 514, the remote security system 104 determines that the events 108 it received from the computing device are indeed associated with malicious code (i.e., the computing device 102 is potentially/likely compromised), the process 500 follows the "yes" route from block 514 to block 518 where an alert is generated by the remote security system 104. This alert may be displayed in the administrative UI 222 in association with the particular computing device 102 for consumption by an analyst 216 of the remote security system 104. Alternatively, the alert (or the events 108 associated therewith) may be provided to a machine learning model of the remote security system 104 to automatically determine whether to contain the computing device 102.

At 520, a determination is made as to whether the computing device 102 is to be contained or not. This determination at block 520 may be a human-driven determination or an automatic determination, as described herein. If, at block 520, it is determined to refrain from containing the computing device 102, the process 500 follows the "no" route from block 520 back to block 510 to receive and analyze more events 108 and to iterate over blocks 510-520.

If, at block 520, it is determined to contain the computing device 102 (e.g., the analyst 216 selected the "contain" element/button 230 of the administrative UI 222, or the remote security system 104 automatically determines to contain the computing device 102 based on machine learning model output), the process 500 may follow the "yes" route from block 520 to block 522, where it is determined whether a whitelist is to be sent to the computing device 102 in conjunction with a the contain instruction 114. For example, a preconfigured whitelist may be associated with the computing device 102 (or a group of host machines of which the computing device 102 is a member), or the analyst 216 of the remote security system 104 may specify a whitelist of one or more remote network addresses (e.g., IP addresses) on-the-fly.

If a whitelist is specified for the particular computing device 102, the process 500 follows the "yes" route from block 522 to block 524, where the remote security system 104 may send, over the computer network 106 and to the computing device 102, the whitelist based on the "yes" determination at block 522.

At 526, the remote security system 104, via the containment module 200, may send, over the computer network 106 and to the computing device 102, an instruction 114 to contain the computing device 102. This may occur with or without the whitelist, such as by following the "no" route from block 522 when there is no whitelist to be sent to the computing device 102. The contain instruction 114 and the whitelist 524 may be sent substantially contemporaneously, or at different times, and possibly over completely different channels via the computer network 106. Although FIG. 5 may imply that the whitelist is sent before the contain instruction 114, the whitelist can be sent after the contain instruction 114, in some implementations.

In some embodiments, the containment module 200 of the remote security system 104 may wait for an acknowledgement response from the containment module 308 of the computing device's 102 kernel-level security agent 300 in response to sending the contain instruction 114 at block 526 and/or sending the whitelist at block 524. An absence of such an acknowledgement may indicate that the computing device 102 is offline. If the computing device 102 is offline at the time the contain instruction 114 is sent at block 526 for example, the contain instruction 114 may be held in a queue until the computing device 102 comes online, and the contain instruction 114 can be sent at block 526 in response to determining that the computing device 102 comes back online. This may be effected by polling the computing device 102 periodically while the computing device is offline, and once an acknowledgement is received to such polling, the contain instruction 114 can be sent.

Returning to block 516, the computing device 102 may receive the contain instruction 114 from the remote security system 104, and upon receipt of the contain instruction 114, the remainder of the process 500 is triggered by following the "yes" route from block 516. If a whitelist is received from the remote security system 104 at block 528, the process 500 may follow the "yes" route from block 528 to block 530 where the kernel-level security agent 300 may dynamically update the firewall policy 310 to specify one or more remote network addresses (e.g., remote IP addresses) specified in the whitelist, and to specify an action to allow outgoing data packets 132 to, and incoming data packets 132 from, one or more computer systems 130 associated with the one or more remote network addresses in the whitelist. The remote network address(es) specified in the whitelist may be considered a blanket whitelist (all TCP or UDP ports), or may be specified on a per-port basis in the whitelist.

At 532, either after dynamically updating the firewall policy 310 with the whitelist information, or by following the "no" route from block 528 when no whitelist is received from the remote security system 104, the kernel-level security agent 300, via the containment module 308, may contain the computing device 102, such as by implementing the firewall policy 310 at block 534. The firewall policy 310 can be implemented at block 534 from the kernel mode 404 or from the user mode 406 of the computing device 102, as described herein. For example, the security agent 300 can utilize a kernel-mode component, such as the kernel-mode component 402 of FIG. 4, as a firewall configuration component to implement the firewall policy 310, or the security agent 300 can utilize a user-mode component, such as the user-mode component 400 of FIG. 4, as the firewall configuration component to implement the firewall policy 310. Implementing and enforcing the firewall policy 310 at block 534 denies outgoing data packets 126 from, and incoming data packets 128 to, the computing device 102 that would have been allowed prior to the implementing of the firewall policy 310. Thus, further potential damage from malware propagating to network-adjacent host machines is mitigated, if not prevented, by the process 500. The firewall policy 310, when implemented and enforced, may block all incoming and outgoing TCP/IP connections in an extreme implementation. Alternatively, one or more remote network addresses may be specified as an exception to allow incoming and outgoing TCP/IP connections thereto. These "exceptions" can be preconfigured in the firewall policy 310 independent of the whitelist that is received, if at all, from the remote security system 104.

In some embodiments, the kernel-level security agent 300 may include multiple different firewall policies 310, and the implementation of a firewall policy 310 at block 534 may involve a determination as to which firewall policy of multiple different firewall policies to implement. The different firewall policies 310 may contain the computing device 102 in different ways, such as a first firewall policy 310 that cuts off all network connectivity, including connectivity to the remote security system 104, and a second firewall policy 310 that cuts off all network connectivity except connectivity to the remote security system 104. Thus, a single firewall policy 310, or a firewall policy 310 among multiple different firewall policies 310, may specify at least one remote network address (e.g., remote IP address) associated with the remote security system 104 and an action to allow outgoing data packets 132 to, and incoming data packets 132 from, the remote security system 104, which is associated with the at least one remote network address. Deciding between multiple different firewall policies 310 to implement at block 534 may be based on any suitable information, such as information sent with the contain instruction 114 at block 526 (e.g., the analyst 216 deciding which firewall policy 310 to implement, or a machine learning model output being used to decide which firewall policy 310 to implement, etc.), or information obtained by the resident kernel-level security agent 300 (e.g., an analysis of the malware issue on the computing device 102). In an example, a more extreme firewall policy 310 can be implemented at block 526 when there is an indication of a significant threat/attack on the computing device 102, where containment is the utmost priority, whereas, for less significant, or less severe, threats, a less extreme firewall policy 310 can be implemented to leave one or more network connections open to allow other computing devices to communicate with the computing device 102.

In some embodiments, containing the computing device 102 at block 532 may involve additional actions to implementing a firewall policy 310, such as by selectively disabling particular communications interfaces 322 of the computing device 102. In an example, containing the computing device 102 at block 532 may include disabling a Wi-Fi interface/radio, disabling a Bluetooth interface/radio, and/or another particular communications interface 322 of the computing device 102. The determination as to which interface to disable at block 532 may, again, be based on information received from the remote security system 104 with the contain instructions 114 and/or from information obtained by the kernel-level security agent 300, such as information indicating a severity of the threat.

Figure 6:
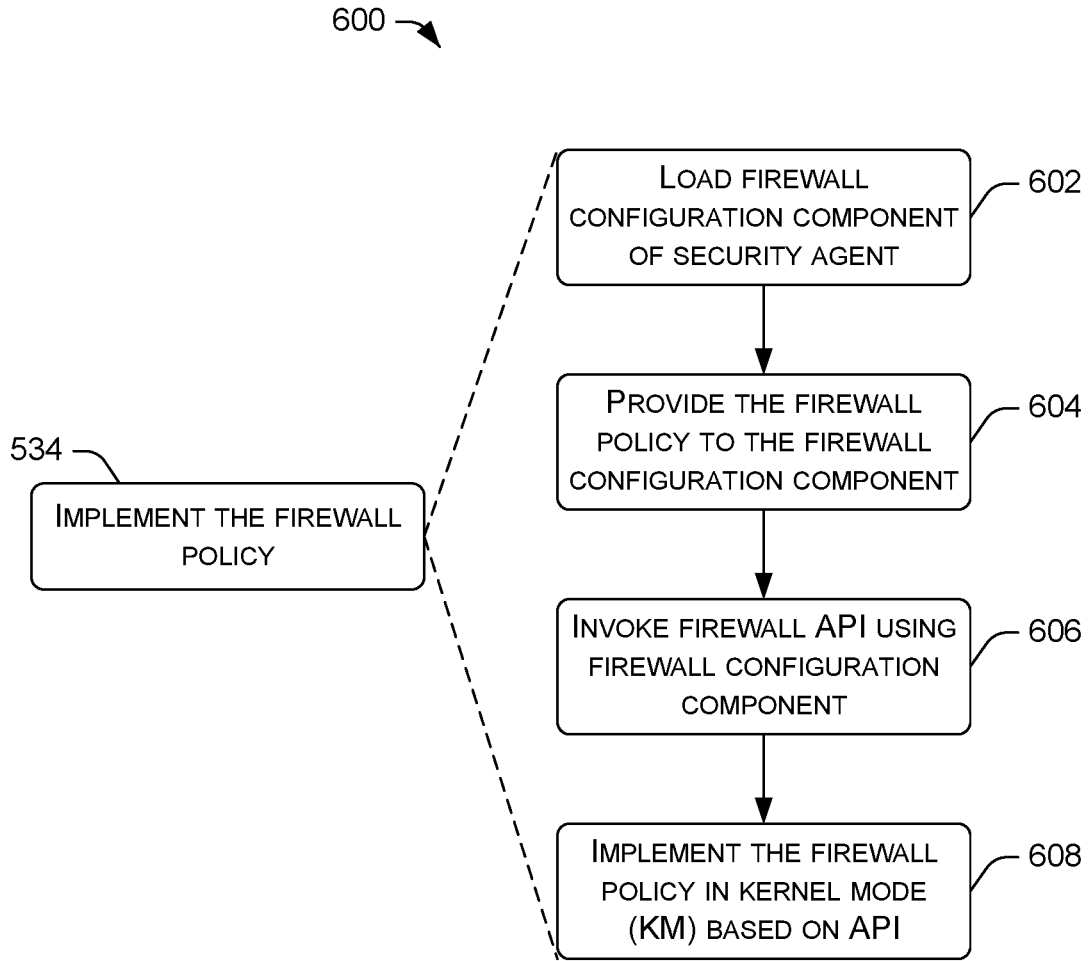
FIG. 6 illustrates an example process for containing a computing device via a firewall configuration component of a kernel-level security agent executing on the computing device.

FIG. 6 illustrates an example process 600 for containing a computing device 102 via a firewall configuration component of a kernel-level security agent 300 executing on the computing device 102. The process 600 may represent a more detailed sub-process of block 534 for implementing the firewall policy 310 to contain the computing device 102.

At 602, the security agent 300 may execute instructions to load a firewall configuration component of the security agent 300. In some embodiments, the firewall configuration component can comprise a kernel-mode component, such as the kernel-mode component 402 in FIG. 4. In other embodiments, the firewall configuration component can comprise a user-mode component, such as the user-mode component 400 of FIG. 4. In the user-mode component 400 example, the kernel-mode component 402 of the security agent 300 may, at block 602, execute instructions (e.g., per a configuration of the containment module 308) to load the user-mode component 400 in user mode 406 of the computing device 102, where the user-mode component 400 acts as the firewall configuration component.

At 604, the firewall policy 310 that is accessible to the security agent 300 may be provided to the firewall configuration component. Again, if configuration of the firewall occurs in the kernel mode 404 of the computing device 102, the firewall policy 310 may be provided to the kernel-mode component 402 of the security agent 300, where the kernel-mode component 402 acts as the firewall configuration component. In the user-mode component 400 example, the kernel-mode component 402 may provide the firewall policy 310 to the user-mode component 400, where the user-mode component 400 acts as the firewall configuration component.

At 606, the firewall configuration component may be used to invoke a firewall API to implement the firewall policy 310. Again, this may occur in the kernel mode 404 of the computing device 102 by the kernel-mode component 402 invoking the firewall API from the kernel mode 404. In the user-mode component 400 example, the user-mode component 400 may be used to invoke a firewall API 412 from the user mode 406 of the computing device 102 to implement the firewall policy 310.

At 608, the firewall policy 310 may be implemented in kernel mode 404 of the computing device 102 based at least in part on the API 412 invoked using the firewall configuration component (e.g., the kernel-mode component 402 or the user-mode component 400 of the security agent 300).

In some embodiments, the process 600 (which is an example process to implement the firewall policy 310 for purposes of network containment) may be carried out using a packet filter (PF) implementation of the operating system 306 of the computing device 102. In this PF implementation, the kernel-mode component 402 of the security agent 300 may include, without limitation, a network filtering implementation (NFI) component that interacts with a Network Policy Manager (NPM) via a published API. The NFI component may maintain, in kernel mode 404, an ActiveRules list in its internal state, the ActiveRules list comprising a list of RuleBoxes representing the current active firewall ruleset. A "RuleBox" is used herein to mean a class wrapping of an NPM_RULE, providing AddRef( )/Release( ) semantics, similar to a shared_ptr<NPM_RULE. Also a "RuleToken" is used herein to mean a RuleBox reference. A RuleBox may be aware of its reference count.

Other attributes of the security agent's 300 kernel-mode component 402 may include, without limitation, a "Transaction", a "Zombies list", and a "Snapshot." A "Transaction" comprises a list of Rule Modifications to perform on the current active firewall ruleset, and may be represented as a list of (Modification, RuleBox) pairs. Also, a "TransactionToken" is used herein to mean a Transaction reference. A "Zombies list" is utilized for debugging and tampering detection, and it holds rules that have been removed from PF. A "Snapshot" is utilized for rule enumeration, such as when the current active firewall ruleset is snapshotted, an array of RuleBox references are created. The NPM can remove rules as it iterates through the snapshot.

The NFI component of the kernel-mode component 402 may also manage transaction and rule actions, as initiated by the NPM. When the NPM commits a transaction (CommitTransaction), the current active firewall ruleset may be updated by applying the list of Rule Modifications to the current active firewall ruleset. The NFI component may also "flush" the active firewall ruleset to user mode 406 via a single UserProxy request+response. This may represent a detailed implementation of providing the firewall policy 310 to the user-mode component 400 at block 604.

The NPM in kernel mode 404 may also request a rule enumeration (EnumerateExistingRules) to get current rules (GetRules) from user mode 406, and to update the ActiveRules list as needed. In making such a rule enumeration request, if the NPM has no rules, the NPM may receive some rules from user mode 406, and if the NPM has some rules, it may receive the same rules from the user mode 406. Note that if the NPM has some rules, and it receives different (or no) rules from the user mode 406, tampering has occurred. During rule enumeration, the NFI component may query the PF via a single UserProxy request+response, and may update its internal state, and then enumerate the current active firewall ruleset to the NPM.

The NFI component in kernel mode 404 may depend on CSDaemon to set and list the active rules via ioctl( ) calls on /dev/pf. CSDaemon may also, on startup, enable PF, patch /etc/pf.conf to add and load an anchor from a remote source, and then reload /etc./pf.conf, and create a persistent file /etc./pf.anchors. The API calls may also be wrapped in UserProxy messages and passed to CSDaemon. Here, the rules may be written into a persistent file in /etc/pf.anchors. To set the persisted rules at system startup, /etc/pf.conf and /etc/pf.anchors may be written, and CSDaemon may enable PF when it starts up, if not already persistently enabled via System Preferences. At startup, the NPM may request a rule enumeration.

In some embodiments, for outbound TCP connections, a temporary rule may be set by the Socket layer allowing connections from an ephemeral port. This temporary rule may exist for the lifetime of the Socket connection. The operating system 306 may issue a bind( ) call to the operating system 306 kernel, and use the temporary port selected by the operating system 306 as reported by getsockname( ) as a random ephemeral port.

In some embodiments, outbound domain name system (DNS) requests may be allowed by a temporary rule during the lifetime of the Socket's connect attempt, and the rule may be removed as soon as the connection succeeds. A multicast DNS port may be allowed in the temporary rule as well. A list of known IP addresses, generated by config, may be used if DNS requests fail with such a temporary rule in place.

In some embodiments, dynamic host configuration protocol (DHCP) requests and responses from a DHCP service may be allowed by configd. Furthermore, an allow rule may permit inter-process communication over a loopback interface. Also, outgoing ICMP/ICMPv6 traffic may be blocked during containment.

AddRule and RemoveRule may be called with no transaction token. In those cases, a transaction is created and committed on the caller's behalf. GetRules provides a rule count and a buffer of NPM_RULEs. SetRules sends a rule count and a buffer of NPM_RULEs to user mode 406. The NFI component in kernel mode 404 may block until responses are received from these messages.

The security agent's 300 user-mode component 400 may include various attributes, including, without limitation, a PfControl, SetRules, GetRules, FreeRules, and PfDevice. PfControl keeps PF enabled as long as the shared instance is retained. It uses the PF "StartRef" and "StopRef" ioctl commands to start and stop PF with a reference. Using these references ensures that there is no interference with other firewalls on the computing device 102. SetRules, GetRules, and FreeRules are public PF rule setting APIs for CSDaemon. PfDevice is an internal class, used to open /dev/pf and perform ioctl's to get and set rules.

On startup, the operating system 306 (e.g., a Mac™ operating system) automatically loads the root ruleset from /etc/pf.conf, and may also enable PF if the user has enabled Firewall in System Preferences>Security & Privacy. The rule anchor is inserted into the root ruleset by patching /etc/pf.conf. This makes PF evaluate the custom rules of the firewall policy 310 included in the security agent 300. The rules are modified, overwritten, or cleared in the anchor. The rules are dynamically set in the anchor via ioctl, and the rules are persisted by writing them to /etc/pf.anchors. A line is added to /etc/pf.conf to automatically load the firewall rules from the file at startup.

It is recognized that PF files used for persisting network containment are potentially vulnerable to modification. To remedy this, various Vnode events can be generated for various accesses at points where the operating system 306 is already determining access permission, and a blocking context is added to these events. A filter/actor event flow can compare the desired access against a configured list of files and permitted accesses, and set the blocking context appropriately. Then, access can be allowed or denied via these existing calls from the operating system 306, which may be done on a per process basis.

Figure 7:
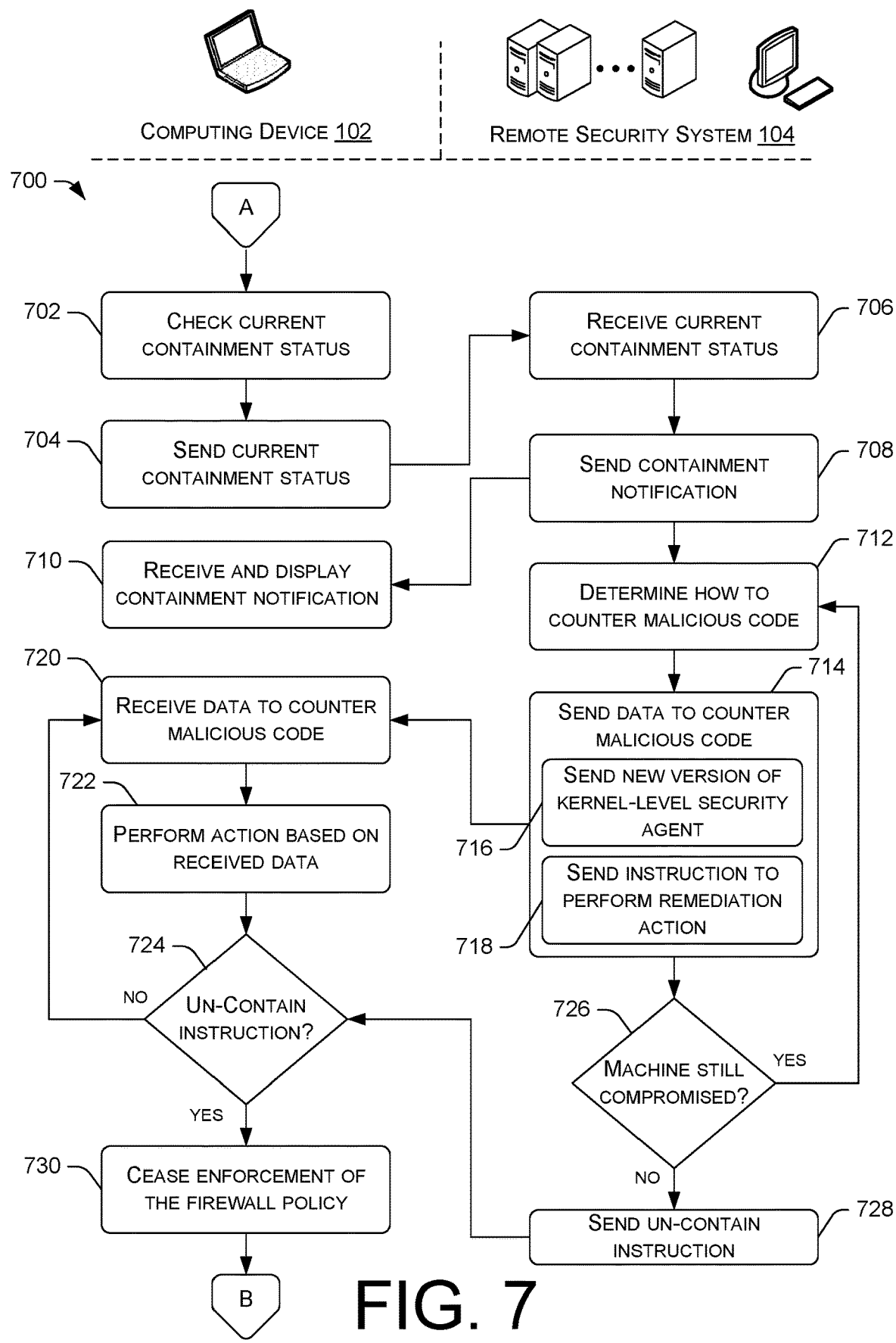
FIG. 7 illustrates an example process for sending containment status updates from a contained computing device, performing remediation actions on the computing device during containment, and freeing the computing device from containment.

FIG. 7 illustrates an example process 700 for sending containment status updates from a contained computing device 102, performing remediation actions on the computing device 102 during containment, and freeing the computing device 102 from containment. As shown by the off-page reference "A" in FIGS. 5 and 7, the process 700 may continue from block 532 of the process 500, after the computing device 102 has been contained.

At 702, the containment module 300 of the security agent 300 may check a current containment status. In this example, the computing device 102 is assumed to have been contained via the process 500, and the containment status is "contained" as a result of this process 500.

At 704, the computing device 102 may send, over the computer network 106, the current containment status to the remote security system 104.

At 706, the remote security system's 104 containment module 200 may receive the current containment status to ensure that its containment status on record is accurate.

At 708, the containment module 200 of the remote security system 104 may send, over the computer network 106 and to the computing device 102, a notification that the computing device 102 has been contained. This notification may include contact information (e.g., a phone number, email address, etc.) of support personnel at the remote security system 104 that the user 312 may contact to learn more about the containment status of the computing device 102.

At 710, the containment notification may be received by the computing device 102, over the computer network 106, and displayed on a display of the computing device 102 for consumption by the user 312.

Meanwhile, at 712, the remote security system 104 may determine how to counter malicious code on the computing device 102. For example, the remote security system 104 may determine, at block 712, that an updated version of the kernel-level security agent 300 may counter the malicious code, rendering the malicious code ineffective, or a remediation action, as described herein, may be determined at block 712.

At 714, the remote security system 104 may send data to the computing device 102 in an effort to heal the computing device 102, or to otherwise counter the malicious code executing on the computing device. For example, at 716, this data can include a new version of the kernel-level security agent 300 with a patch that is configured to counter the malicious code. As another example, at 718, this data can include an instruction to perform a remediation action to counter the malicious code executing on the computing device 102. In some embodiments, the data sent at block 714 can also include additional whitelists that are sent after containment is initiated to allow communication with one or more other computing systems 130. This may enable support personnel to remote into the affected computing device to help remediate the malware attack.

At 720, the kernel-level security agent 300 of the computing device 102 may receive the data from the remote security system 104, and at 722, the security agent 300 can perform an action based on the received data. The action performed at 722 can include installing a new version of the kernel-level security agent 300, performing a remediation action, or any similar action.

At 724, the containment module 308 of the security agent 300 waits for an un-contain instruction from the remote security system 104. Unless and until such an instruction is received, the process 700 follows the "no" route from block 724 back to block 720 where more data may be received from the remote security system 104 while the healing process continues to "fix" the computing device 102 that has been compromised.

Meanwhile, at block 726, after sending data to counter the malicious code, the remote security system 104 determines whether the computing device 102 is still compromised. This may be accomplished by continuing to receive and analyze events 108 associated with activity on the computing device 102, as observed by the kernel-level security agent 300. Other remote testing may be performed at block 726 to assess the host computing device 102 in this regard. If the determination at block 726 is that the host computing device 102 is still compromised, the process 700 follows the "yes" route from block 726 back to block 712 where the remote security system 104 may iteratively determine different ways of countering the malicious code executing on the computing device 102 while the computing device 102 is contained.

If, at block 726, it is determined that the malware attack has been defeated, and that the computing device 102 is no longer compromised, the process 700 follows the "no" route from block 726 to block 728 where the containment module 200 of the remote security system 104 sends an un-contain instruction, over the computer network 106, to the containment module 308 of the security agent 300 on the computing device 102. This "un-contain" instruction is the opposite of a contain instruction 114 in that it is an instruction to deactivate containment of the computing device 102, and it may be sent in response to a selection of an appropriate selection element/button on the administrative UI 222. An analyst 216 of the remote security system 104 may select this UI element to deactivate containment, causing the instruction to be sent at block 728.

In some embodiments, the containment module 200 of the remote security system 104 may wait for an acknowledgement response from the containment module 308 of the computing device's 102 kernel-level security agent 300 in response to sending the un-contain instruction at block 728. An absence of such an acknowledgement may indicate that the computing device 102 is offline. If the computing device 102 is offline at the time the un-contain instruction is sent at block 728 for example, the un-contain instruction may be held in a queue until the computing device 102 comes online, and the un-contain instruction can be sent at block 728 in response to determining that the computing device 102 comes back online. This may be effected by polling the computing device 102 periodically while the computing device is offline, and once an acknowledgement is received to such polling, the un-contain instruction can be sent.

At 724, upon receiving the un-contain instruction from the remote security system 104, the containment module 308 of the security agent 300 on the computing device 102 may, at block 730, cease enforcement of the firewall policy 310 so that the outgoing data packets and the incoming data packets that were denied during containment are thereafter allowed, reverting the network connectivity status of the computing device 102 to its original state prior to network containment.

As shown by the off-page reference "B" in FIGS. 5 and 7, the process 700 may continue from block 730 back to block 506, where the computing device 102 performs the remainder of the process 500 from block 506, and to contain the device 102 again, if needed.

Figure 8A:
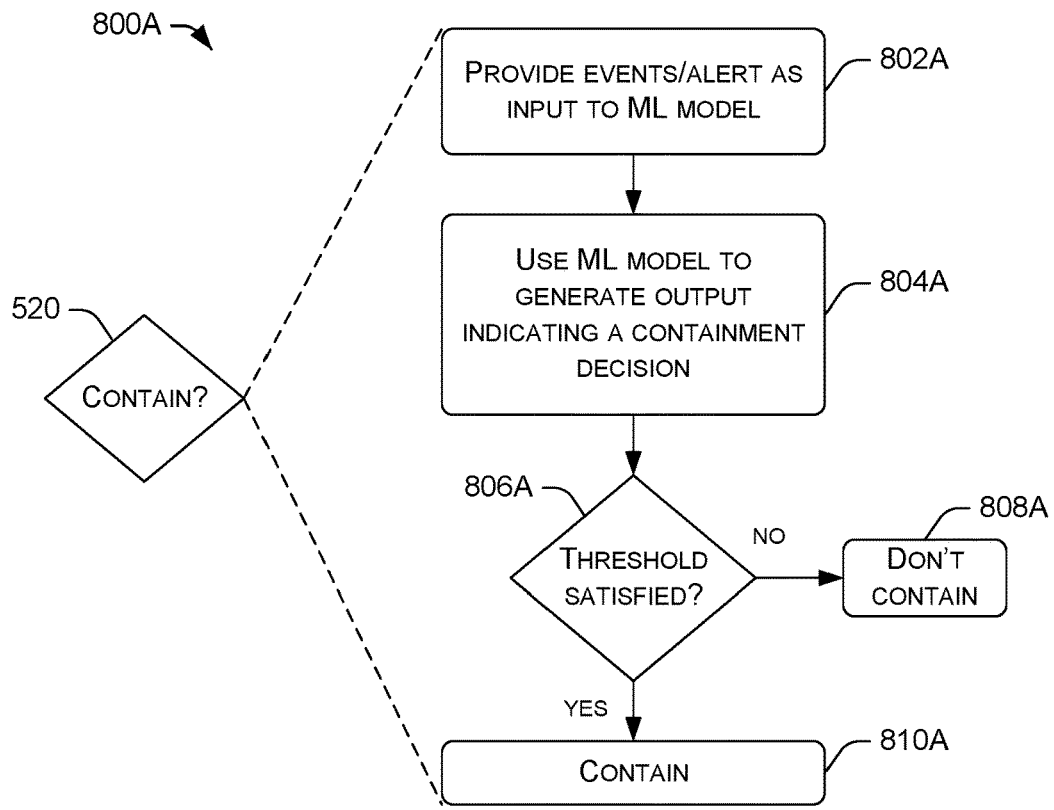
FIG. 8A illustrates an example process for implementing automated containment of a potentially compromised computing device.

FIG. 8A illustrates an example process 800A for implementing automated containment of a potentially compromised computing device 102. The process 800A may be a sub-process of block 520 of the process 500 of FIG. 5, where the remote security system 104 determines whether to contain the computing device 102.

At 802A, events 108 that are received from a host computing device 102 may be provided as input to a machine learning mode. These events 108 may have already generated an alert in the remote security system 104 that the events 108 are associated with malicious code. The machine learning model is configured to determine whether to contain the computing device 102 based on these events 108, regardless of whether the alert was generated or not.

At 804A, the machine learning model may generate output that indicates a containment decision. For example, the output may be provided as one of "contain" or "do not contain." A contain output may be provided along with a confidence score, which may be expressed as a percentage or a similar statistic.

At 806A, a determination is made as to whether the confidence score associated with the model's output satisfies a threshold (e.g., by being greater than a threshold confidence). If, at 806A, the machine learning model's output does not indicate a contain decision above a threshold confidence, the containment module 200 of the remote security system 104 may refrain from containing the computing device 102 at block 808A.

On the other hand, if, at 806A, the threshold is satisfied, indicating a contain decision with high confidence, the containment module 200 may automatically contain the computing device 102 at 810A by sending a contain instruction 114 to the computing device 102 automatically, without human intervention.

Figure 8B:
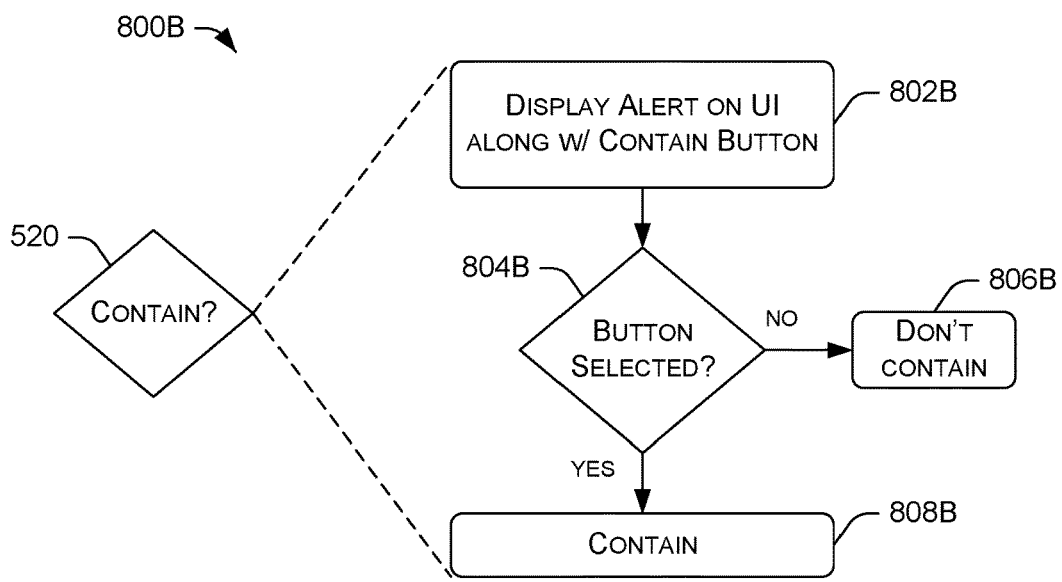
FIG. 8B illustrates an example process for implementing human-driven containment of a potentially compromised computing device.

FIG. 8B illustrates an example process 800B for implementing human-driven containment of a potentially compromised computing device 102. The process 800B may be a sub-process of block 520 of the process 500 of FIG. 5, where the remote security system 104 determines whether to contain the computing device 102.

At 802B, an alert indicating that the computing device 102 has been compromised may be presented, on a display of a computing device 214 of the remote security system 104, such as in the administrative UI 222, along with a selection element/button 230 to contain the computing device 102.

At 804B, a determination is made as to whether the selection element/button 230 is selected, and if not, the process 800B follows the "no" route to 806B, where the containment module 200 of the remote security system 104 may refrain from containing the computing device 102.

If, on the other hand, the remote security system 104 receives a selection of the selection element/button 230 via the user interface 222, the containment module 200 may send a contain instruction 114 to the computing device 102, as described herein. Therefore, FIGS. 8A and 8B illustrate different implementations for automatic and human-driven containment of a computing device 102, respectively.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method implemented by a remote security system, the method comprising:
sending, over a computer network and to a computing device, a kernel-level security agent to be installed on the computing device, the kernel-level security agent including a firewall policy that, upon implementation and enforcement on the computing device, denies outgoing data packets from, and incoming data packets to, the computing device that are otherwise allowed prior to the implementation and enforcement of the firewall policy;
receiving, over the computer network and from the computing device, events associated with activity on the computing device, the events having been observed by the kernel-level security agent;
determining that the events are associated with malicious code; sending, over the computer network and to the computing device, a first instruction to contain the computing device by enforcing the firewall policy;
receiving, over the computer network and from the computing device, additional events associated with subsequent activity on the computing device, the additional events having been observed by the kernel-level security agent;
determining, based at least in part on the additional events, that the computing device is no longer compromised; and
sending, over the computer network and to the computing device, a second instruction to deactivate containment of the computing device by ceasing enforcement of the firewall policy on the computing device.

2. The method of claim 1, further comprising:
automatically determining, based at least in part on output of a machine learning model that processes the events as input, to contain the computing device, wherein the sending the instruction to contain the computing device is performed automatically, without human intervention.

3. The method of claim 1, wherein the computing device is a first computing device, the method further comprising, after the determining: presenting, on a display of a second computing device of the remote security system, a user interface that includes:
an alert indicating that the first computing device has been compromised; and
a selection element to contain the first computing device; and
receiving a selection of the selection element via the user interface, wherein the sending of the instruction is in response to the receiving of the selection.

4. The method of claim 3, wherein the selection element is a first selection element, the selection is a first selection, and the user interface further includes a second selection element to provide information pertaining to the alert, the method further comprising:
receiving a second selection of the second selection element via the user interface; and
presenting the information on the display via the user interface.

5. The method of claim 1, further comprising sending, over the computer network and to the computing device, a whitelist including one or more remote network addresses to allow the computing device to communicate with one or more computing systems associated with the one or more remote network addresses while the firewall policy is enforced on the computing device.

6. The method of claim 1, wherein the instruction is a first instruction, the method further comprising, after the sending of the first instruction, sending, over the computer network and to the computing device, data including at least one of:
a new version of the kernel-level security agent that includes a patch configured to counter the malicious code; or
a second instruction to perform a remediation action to counter the malicious code.

7. A system comprising:
one or more processors; and
memory storing computer-executable instructions that, when executed by the one or more processors, cause the system to:
send, over a computer network and to a computing device, a kernel-level security agent to be installed on the computing device, the kernel-level security agent including a firewall policy that, upon implementation and enforcement on the computing device, denies outgoing data packets from, and incoming data packets to, the computing device that are otherwise allowed prior to the implementation and enforcement of the firewall policy;
receive, over the computer network and from the computing device, events associated with activity on the computing device, the events having been observed by the kernel-level security agent;
determine that the events are associated with malicious code;
send, over the computer network and to the computing device, a first instruction to enforce the firewall policy to contain the computing device;
receive, over the computer network and from the computing device, additional events associated with subsequent activity on the computing device, the additional events having been observed by the kernel-level security agent;
determine, based at least in part on the additional events, that the computing device is no longer compromised; and
send, over the computer network and to the computing device, a second instruction to deactivate containment of the computing device by ceasing enforcement of the firewall policy on the computing device.

8. The system of claim 7, wherein the computer-executable instructions, when executed by the one or more processors, further cause the system to:
automatically determine, based at least in part on output of a machine learning model that processes the events as input, to contain the computing device, wherein sending the instruction is performed automatically, without human intervention.

9. The system of claim 7, wherein the computing device is a first computing device, and wherein the computer-executable instructions, when executed by the one or more processors, further cause the system to, after determining that the events are associated with the malicious code:

present, on a display of a second computing device of the system, a user interface that includes:
    an alert indicating that the first computing device has been compromised; and
    a selection element to contain the first computing device; and
receive a selection of the selection element via the user interface, wherein sending the instruction is in response to receiving the selection.

10. The system of claim 7, wherein the computer-executable instructions, when executed by the one or more processors, further cause the system to send, over the computer network and to the computing device, a whitelist including one or more remote network addresses.

11. The system of claim 7, wherein the instruction is a first instruction, and wherein the computer-executable instructions, when executed by the one or more processors, further cause the system to, after sending the first instruction, send, over the computer network and to the computing device, data including at least one of:
    a new version of the kernel-level security agent that includes a patch configured to counter the malicious code; or
    a second instruction to perform a remediation action to counter the malicious code.

12. The system of claim 7, wherein the computer-executable instructions, when executed by the one or more processors, further cause the system to, after sending the instruction, hold the instruction in a queue and periodically poll the computing device until an acknowledgement is received from the computing device, the acknowledgement indicating that the computing device received the instruction.

13. One or more non-transitory computer-readable media storing computer-executable instructions that, when executed by one or more processors of a system, cause the system to perform operations comprising:
    sending, over a computer network and to a computing device, a kernel-level security agent to be installed on the computing device, the kernel-level security agent including a firewall policy that, upon implementation and enforcement on the computing device, denies outgoing data packets from, and incoming data packets to, the computing device that are otherwise allowed prior to the implementation and enforcement of the firewall policy;
    receiving, over the computer network and from the computing device, events associated with activity on the computing device, the events having been observed by the kernel-level security agent;
    determining that the events are associated with malicious code;
    sending, over the computer network and to the computing device, a first instruction to contain the computing device, the instruction causing the computing device to enforce the firewall policy;
    receiving, over the computer network and from the computing device, additional events associated with subsequent activity on the computing device, the additional events having been observed by the kernel-level security agent;
    determining, based at least in part on the additional events, that the computing device is no longer compromised; and
    sending, over the computer network and to the computing device, a second instruction to deactivate containment of the computing device by ceasing enforcement of the firewall policy on the computing device.

14. The one or more non-transitory computer-readable media of claim 13, the operations further comprising:
    automatically determining, based at least in part on output of a machine learning model that processes the events as input, to contain the computing device, wherein the sending of the instruction is performed automatically, without human intervention.

15. The one or more non-transitory computer-readable media of claim 13, wherein the computing device is a first computing device, the operations further comprising, after the determining:
    presenting, on a display of a second computing device of the system, a user interface that includes:
        an alert indicating that the first computing device has been compromised; and
        a selection element to contain the first computing device; and
        receiving a selection of the selection element via the user interface, wherein the sending of the instruction is in response to the receiving of the selection.

16. The one or more non-transitory computer-readable media of claim 13, the operations further comprising sending, over the computer network and to the computing device, a whitelist including one or more remote network addresses.

17. The one or more non-transitory computer-readable media of claim 13, wherein the instruction is a first instruction, the operations further comprising, after the sending of the first instruction, sending, over the computer network and to the computing device, data including at least one of:
    a new version of the kernel-level security agent that includes a patch configured to counter the malicious code; or
    a second instruction to perform a remediation action to counter the malicious code.

* * * * *